US011097953B2

(12) United States Patent
Nikiforov et al.

(10) Patent No.: US 11,097,953 B2
(45) Date of Patent: Aug. 24, 2021

(54) PROCESS FOR PRODUCING LIQUID POLYSILANES AND ISOMER ENRICHED HIGHER SILANES

(71) Applicants: L'Air Liquide, Société Anonyme pour l'Etude et l'Exploitation des Procédés Georges Claude, Paris (FR); American Air Liquide, Inc., Fremont, CA (US)

(72) Inventors: Grigory Nikiforov, Bridgewater, NJ (US); Guillaume Husson, Newark, DE (US); Gennadiy Itov, Flemington, NJ (US); Yang Wang, Garnet Valley, PA (US)

(73) Assignees: L'Air Liquide, Société Anonyme pour l'Etude et l'Exploitation des Procédés Georges Claude, Paris (FR); American Air Liquide, Inc., Fremont, CA (US)

( * ) Notice: Subject to any disclaimer, the term of this patent is extended or adjusted under 35 U.S.C. 154(b) by 497 days.

(21) Appl. No.: 16/158,117

(22) Filed: Oct. 11, 2018

(65) Prior Publication Data

US 2020/0115240 A1   Apr. 16, 2020

(51) Int. Cl.
*C01B 33/04* (2006.01)
*B01J 31/02* (2006.01)

(52) U.S. Cl.
CPC ........... *C01B 33/04* (2013.01); *B01J 31/0275* (2013.01); *C01B 33/046* (2013.01)

(58) Field of Classification Search
CPC ..... C01B 33/04; C01B 33/046; B01J 31/0275
See application file for complete search history.

(56) References Cited

U.S. PATENT DOCUMENTS

| | | | |
|---|---|---|---|
| 5,047,569 A | 9/1991 | Berris | |
| 5,087,719 A | 2/1992 | Tilley et al. | |
| 5,700,400 A | 12/1997 | Ikai et al. | |
| 8,513,450 B2 * | 8/2013 | Bockholt | C08G 77/60 556/481 |
| 8,709,369 B2 | 4/2014 | Brausch et al. | |
| 9,567,228 B2 | 2/2017 | Matsushita et al. | |
| 2008/0085373 A1 | 4/2008 | Karshtedt et al. | |
| 2009/0269559 A1 | 10/2009 | Lee et al. | |
| 2010/0184268 A1 | 7/2010 | Hirota | |
| 2010/0197102 A1 | 8/2010 | Akao et al. | |
| 2011/0158886 A1 | 6/2011 | Shimoda et al. | |
| 2012/0101291 A1 | 4/2012 | Bockholt et al. | |
| 2013/0216465 A1 | 8/2013 | Auner et al. | |
| 2015/0078980 A1 | 3/2015 | Lee et al. | |
| 2016/0126093 A1 | 5/2016 | Dube et al. | |
| 2016/0297997 A1 | 10/2016 | Cadiz Bedini | |
| 2017/0018427 A1 | 1/2017 | Huang et al. | |
| 2019/0256361 A1 | 8/2019 | Nomura et al. | |

FOREIGN PATENT DOCUMENTS

| | | |
|---|---|---|
| JP | H06 191821 | 7/1994 |
| JP | 2000 031066 | 1/2000 |
| JP | 3 185 817 | 7/2001 |
| JP | 3 484 815 | 1/2004 |
| JP | 2015 523304 | 8/2015 |
| WO | WO 2010 003729 | 1/2010 |
| WO | WO 2012 001180 | 1/2012 |
| WO | WO 2013 019208 | 2/2013 |
| WO | WO 2017 213155 | 12/2017 |

OTHER PUBLICATIONS

Banovetz, J.P. et al., "Stereoselectivity in the catalytic oligomerization of phenylsilane," Organometallics 1991, 10, 3430-3432.
Boudjouk, P. et al., "Nickel catalysed coupling of phenylhydrosilanes," J. Chem. Soc. Chem. Comm. 1991, 245-246.
Bourg, S. et al., "New stable titanocene and zirconocene catalyst precursors for polysilane synthesis via dehydrocoupling of hydrosilanes," Organometallics 1995, 14, 564-566.
Corey, J.Y. et al., "Catalytic dehydrogenative coupling of secondary silanes with Cp2MCl2-nBuLi," Organometallics, 1991, 10, 924-930.
Corey, J.Y., "Dehydrocoupling of hydrosilanes to polysilanes and silicon oligomers: A 30 year overview," Advances in Organometallic Chemistry, vol. 51, 2004, 1-52.
Feigl, A. et al., "Metal-free polymerization of phenylsilane: tris(pentafluorophenyl)borane-catalyzed synthesis of branched polysilanes at elevated temperatures," Chem. Eur. J. 2013, 19, 12526-12536.
Fontaine, F.-G. et al., "Dehydrogenative oligomerization of PhSiH3 catalyzed by (1-Me-Indenyl)Ni(PR3)(Me)," Organometallics 2002, 21, 401-408.
Fontaine, F.-G. et al., "Me2AlCH2PMe2: A new, bifunctional cocatalyst for the Ni(II)-catalyzed oligomerization of PhSiH$_3$," J. Am. Chem. Soc. 2004, 126, 8786-8794.
Hart, J. et al., "Tetrasilane and digermane for the ultra-high vacuum chemical vapor deposition of SiGe alloys," Thin Solid Films, 2016, 604, 23-27.
Hazbun, R. et al., "Silicon epitaxy using tetrasilane at low temperatures in ultra-high vacuum chemical vapor deposition," Journal of Crystal Growth, 2016, 444, 21-27.

(Continued)

*Primary Examiner* — Yong L Chu
(74) *Attorney, Agent, or Firm* — Allen E. White; Patricia E. McQueeney

(57) ABSTRACT

Synthesis of silanes with more than three silicon atoms are disclosed (i.e., $(Si_nH_{(2n+2)}$ with n=4-100). More particularly, the disclosed synthesis methods tune and optimize the isomer ratio by selection of process parameters such as temperature, residence time, and the relative amount of starting compounds, as well as selection of proper catalyst. The disclosed synthesis methods allow facile preparation of silanes containing more than three silicon atoms and particularly, the silanes containing preferably one major isomer. The pure isomers and isomer enriched mixtures are prepared by catalytic transformation of silane ($SiH_4$), disilane ($Si_2H_6$), trisilane ($Si_3H_8$), and mixtures thereof.

8 Claims, 6 Drawing Sheets

(56) References Cited

OTHER PUBLICATIONS

Hidding, B. et al., "Rocket-propellant characteristics of silanes/$O_2$," Journal of Propulsion and Power 2006, 22, 786-789.

Itazaki, M. et al., "Iron-catalyzed dehydrogenative coupling of tertiary silanes," Angew. Chem. Int. Ed. 2009, 48, 3313-3316.

Kanoh, J. et al., "Chemical vapor deposition of amorphous silicon using tetrasilane," Japanese Journal of Applied Physics, Part 1: Regular Papers, Short Notes & Review Papers, 1993, 32(6A), 2613-2619.

Kim, B.-H. et al., "Dehydrocoupling of 1,1-dihydrotetraphenylsilole to an electroluminescent polysilole," Organometallics 2002, 21, 2796-2798.

Ohshita, J. et al., "Polymeric organosilicon systems. 22. Synthesis and photochemical. properties of poly[(disilanylene)oligophenylylenes and poly[(silylene)biphenylylenes," Organometallics 1994, 13, 5002-5012.

Rosenberg, I. et al., "Catalytic dehydrogenative coupling of secondary silanes using Wilkinson's catalyst," J. Am. Chem. Soc. 2001, 123, 5120-5121.

Schmidt, D. et al., "Si—H bond activation at $\{(NHC)_2Ni^0\}$ leading to hydrido silyl and bis(silyl) complexes: a versatile tool for catalytic Si—H/D exchange, acceptorless dehydrogenative coupling of hydrosilanes, and hydrogenation of disilanes to hydrosilanes,". Dalton Trans. 2014, 43, 10816-10827.

Simone, D. et al.,"Silanes as fuels for scramjets and their applications," Journal of Propulsion and Power 2006, 22, 1006-1011.

Smith, E.E. et al., "Dehydrocoupling of organosilanes with a dinuclear nickel hydride catalyst and isolation of a nickel silyl complex," Organometallics 2010, 29, 6527-6533.

Tanabe, M. et al., "Nickel-catalyzed cyclopolymerization of hexyl- and phenylsilanes," Organometallics 2013, 32, 1037-1043.

Woo, H.-G. et al., "A σ-bond metathesis mechanism for dehydropolymerization of silanes to polysilanes by $d^0$ metal catalysts," J. Am. Chem. Soc. 1992, 114, 7047-7055.

Woo, H.-G. et al., "Dehydrocoupling synthesis and optoelectronic properties of polysilole," Molecular Crystals and Liquid Crystals Science and Technology. Section A. 2000, 349, 1, 87-90.

International Search Report and Written Opinion for corresponding PCT/US2019/055803, dated Feb. 5, 2020.

\* cited by examiner

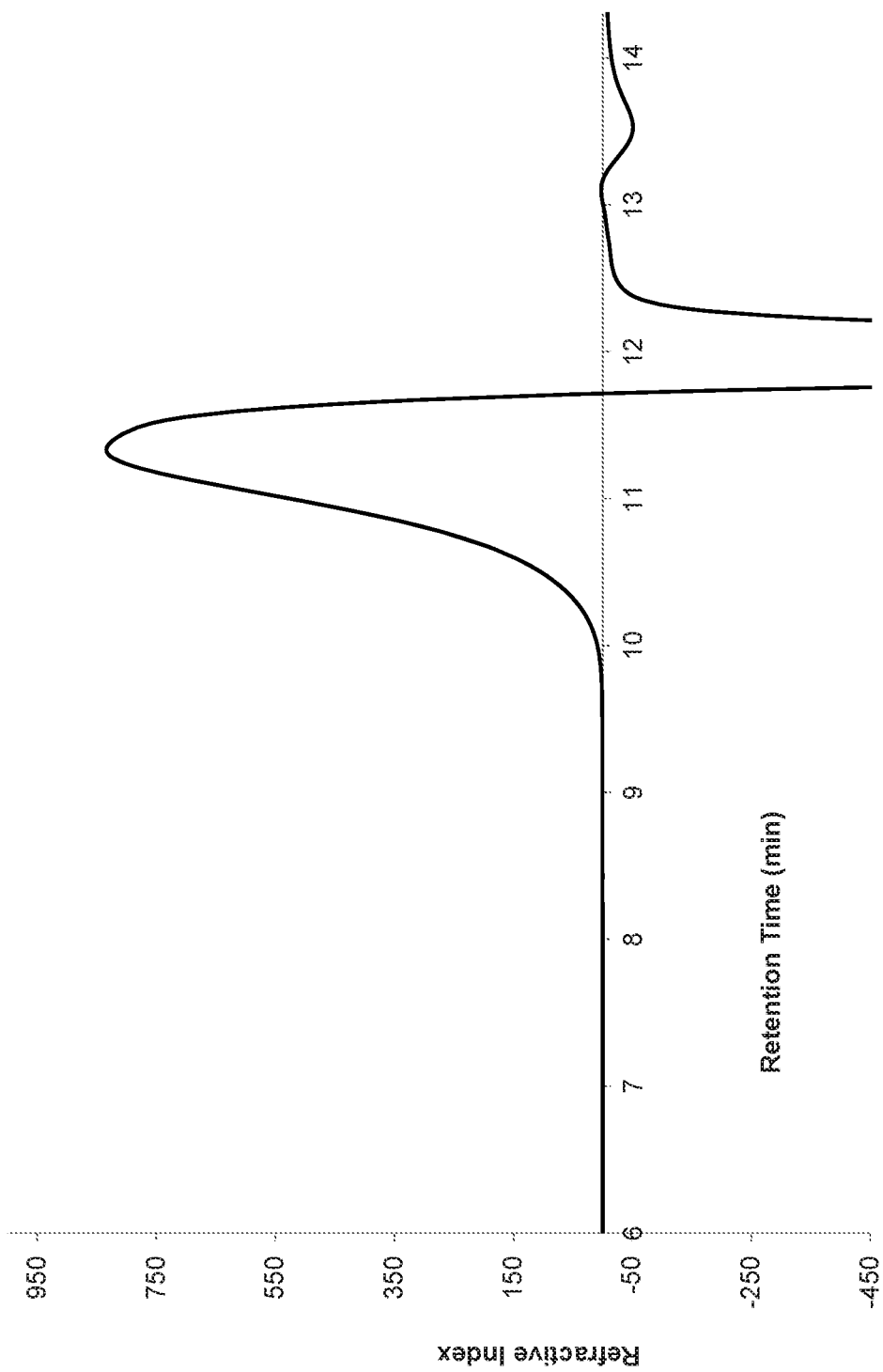

PROCESS FOR PRODUCING LIQUID POLYSILANES AND ISOMER ENRICHED HIGHER SILANES

TECHNICAL FIELD

Methods of synthesizing higher silanes are disclosed (i.e., $Si_nH_{2n+2}$ with n=4-100). More particularly, the disclosed synthesis methods tune and optimize the isomer ratio of higher silanes. The isomer ratio may be optimized by selection of process parameters, such as temperature, residence time, and the relative amount of starting compounds, as well as selection of proper catalyst. The disclosed synthesis methods allow facile preparation of higher silanes and particularly silanes containing one major isomer. The pure isomers and isomer enriched mixtures are prepared by catalytic transformation of silane ($SiH_4$), disilane ($Si_2H_6$), trisilane ($Si_3H_8$), or mixtures thereof.

BACKGROUND

Polysilanes have been used in a variety of industries.

Vapor deposition of silicon-containing films using polysilanes is disclosed by JP Pat No 3,185,817 to Seiko Epson Corp.; Kanoh et al., Japanese Journal of Applied Physics, Part 1: Regular Papers, Short Notes & Review Papers 1993, 32(6A), 2613-2619; JP Pat No 3,484,815 to Showa Denko KK; and JP Pat App Pub No 2000/031066 to Showa Denko KK, among others.

US Pat App Pub No 2010/0184268 A1 claims a method for producing a semiconductor device comprising: coating the coating composition for forming an oxide film comprising: a polysilazane and a polysilane on a substrate and forming the oxide film inside the groove by heat treatment in an oxidizing atmosphere. The formulas of polysilazane $(SiH_2NH)_n$ (n—positive integer) and polysilane $Si_nR_{2n+2}$ and $Si_nR_{2n}$ (n≥3, R—hydrogen) are mentioned only in embodiment.

Epitaxial Si-containing films, such as Si, SiGe, SiC, SiN, and SiO, have been grown using polysilanes as disclosed by Hazbun et al., *Journal of Crystal Growth* 2016, 444, 21-27; US Pat App Pub No 2017/018427 to Yi-Chiau Huang et al.; US Pat App Pub No 2016/126093 to Dube et al.; and Hart et al., *Thin Solid Films* 2016, 604, 23-27]; among others.

Polysilanes have been used as inks for printed electronics as disclosed by US Pat App Pub No 2009/0269559 to Lee et al.; PCT Pub No WO 2015/085980 to Forschungszentrum Juelich GmbH; US Pat App Pub No 2010/197102 to Akao et al.; and JP Pat No 6,191,821 to Showa Denko KK; among others.

Polysilanes have also been used as high specific energy fuels as disclosed by Simone et al., *Journal of Propulsion and Power* 2006, 22, 1006-1011; and Hidding et al., *Journal of Propulsion and Power* 2006, 22, 786-789], among others.

Conversion of lower silanes into higher silanes has been studied extensively both for research and for commercial purposes. Catalytic reactions have been studied. See, e.g., U.S. Pat. No. 5,047,569 to Berris; Corey et al., Organometallics, 1991, 10, 924-930; Boudjouk et al., J. Chem. Soc. Chem. Comm. 1991 245-246; U.S. Pat. No. 5,087,719 to Tilley et al.; Woo et al., J. Am. Chem. Soc. 1992, 114, 7047-7055; Ohshita et al., Organometallics 1994 13, 5002-5012; Bourg et al., Organometallics, 1995, 14, 564-566; Bourg et al., Organometallics 1995, 14, 564-566; U.S. Pat. No. 5,700,400 to Ikai et al.; Woo et al., Mol. Cryst. Liq. Cryst. Sci. Technol., Sect. A, 2000, 349, 87; Rosenberg et al., J. Am. Chem. Soc. 2001, 123, 5120-5121; Fontaine et al., Organometallics 2002, 21, 401-408; Kim et al., Organometallics 2002, 21, 2796; Corey et al., Adv. In Org. Chem. 2004, 51, pp. 1-52; Fontaine et al., J. Am. Chem. Soc. 2004, 126, 8786-8794; U.S. Pat. App. Pub. No. 2008/085373 to Karshtedt et al.; Itazaki et al., Angew. Chem. Int. Ed. 2009, 48, 3313-3316; PCT Pub No WO2010/003729 to Evonik Degussa GMBH; Smith et al., Organometallics 2010, 29, 6527-6533; PCT Pub No WO2012/001180 to SPAWNT PRIVAT S.A.R.L; PCT Pub No WO2013/019208 to Kovio, Inc.; Feigl et al., Chem. Eur. J. 2013, 19, 12526-12536; Tanabe et al., Organometallics 2013, 32, 1037-1043; U.S. Pat. No. 8,709,369 to Brausch et al.; Schmidt et al., Dalton Trans. 2014, 43, 10816-10827; and U.S. Pat. No. 9,567,228 to Matsushita et al.

All these disclosures notwithstanding, commercial use of polysilanes remains elusive.

SUMMARY

Methods of producing $Si_nH_{(2n+2)}$, wherein n=4-100 are disclosed. A liquid $Si_aH_{(2a+2)}$ reactant, wherein a=1-4, is transformed in the presence of a $B(C_6F_5)_3$ catalyst to produce $Si_nH_{(2n+2)}$, wherein n>a. Alternatively, $Si_nH_{(2n+2)}$, wherein n=4-100, may be produced by catalytically converting a $Si_aH_{(2a+2)}$ reactant, wherein a=1-4 and n>a. In another alternative, a $Si_aH_{(2a+2)}$ reactant, wherein a=1-4, is reacted with a $B(C_6F_5)_3$ catalyst to produce $Si_nH_{(2n+2)}$, wherein n=4-100 and n>a. In yet another alternative, a $Si_aH_{(2a+2)}$ reactant, wherein a=1-4, is contacted with a $B(C_6F_5)_3$ catalyst to produce $Si_nH_{(2n+2)}$, wherein n=4-100 and n>a.

Methods of selectively synthesizing isomerically enriched polysilanes having a formula $Si_nH_{(2n+2)}$, wherein n=5-8, are also disclosed. A liquid $Si_nH_{(2n+2)}$ reactant, wherein n=1-4, is catalytically converted to the isomerically enriched polysilane having a ratio of one isomer to another isomer ranging from approximately 2:1 to approximately 15:1.

Any of these disclosed methods may include one or more of the following aspects:
- n=10-30;
- the catalyst being $B(C_6F_5)_3$;
- n=30-50;
- the method not utilizing $H_2$;
- the $Si_aH_{(2a+2)}$ reactant being a liquid;
- the $Si_aH_{(2a+2)}$ reactant being a mixture of a liquid and a gas;
- the $Si_aH_{(2a+2)}$ reactant being $Si_3H_8$;
- the $Si_aH_{(2a+2)}$ reactant being liquid $Si_3H_8$;
- the $Si_aH_{(2a+2)}$ reactant being a mixture of $Si_2H_6$ and $Si_3H_8$;
- the $Si_aH_{(2a+2)}$ reactant being a liquid mixture of $Si_2H_6$ and $Si_3H_8$;
- the $Si_aH_{(2a+2)}$ reactant being a mixture of gaseous $Si_2H_6$ and liquid $Si_3H_8$;
- the mixture comprising between approximately 0.1% w/w to approximately 60% w/w $Si_3H_8$ and between approximately 40% w/w and 99.9% w/w $Si_2H_6$;
- the mixture comprising between approximately 0.1% w/w to approximately 25% w/w $Si_3H_8$ and between approximately 75% w/w and 99.9% w/w $Si_2H_6$;
- the mixture comprising between approximately 0.1% w/w to approximately 10% w/w $Si_3H_8$ and between approximately 90% w/w and 99.9% w/w $Si_2H_6$;
- the $Si_aH_{(2a+2)}$ reactant being a mixture of $Si_3H_8$ and $Si_4H_{10}$;
- the $Si_aH_{(2a+2)}$ reactant being a liquid mixture of $Si_3H_8$ and $Si_4H_{10}$;

the $Si_aH_{(2a+2)}$ reactant being a mixture of gaseous $Si_3H_8$ and liquid $Si_4H_{10}$;

the mixture comprising between approximately 0.1% w/w to approximately 60% w/w $Si_4H_{10}$ and between approximately 40% w/w and 99.9% w/w $Si_3H_8$;

the mixture comprising between approximately 0.1% w/w to approximately 25% w/w $Si_4H_{10}$ and between approximately 75% w/w and 99.9% w/w $Si_3H_8$;

the mixture comprising between approximately 0.1% w/w to approximately 10% w/w $Si_4H_{10}$ and between approximately 90% w/w and 99.9% w/w $Si_3H_8$;

converting approximately 20% w/w to approximately 60% w/w of the $Si_aH_{(2a+2)}$ reactant;

heating the $Si_aH_{(2a+2)}$ reactant prior to mixing with the catalyst;

mixing the $Si_aH_{(2a+2)}$ reactant and catalyst to form a reactant-catalyst mixture;

mixing the $Si_aH_{(2a+2)}$ reactant and catalyst to form a reactant-catalyst mixture for a time period ranging from approximately 1 hour to approximately 24 hours;

heating the reactant-catalyst mixture to a temperature ranging from approximately 30° C. to approximately 55° C.;

mixing the reactant-catalyst mixture at a temperature ranging from approximately room temperature to approximately 53° C.;

mixing the reactant-catalyst mixture at a temperature ranging from approximately 15° C. to approximately 50° C.;

mixing the reactant-catalyst mixture at a temperature ranging from approximately 15° C. to approximately 30° C.;

filtering the reactant-catalyst mixture to separate any solids from the resulting $Si_nH_{(2n+2)}$ mixture;

heating the $Si_aH_{(2a+2)}$ reactant prior to flowing through a reactor containing the catalyst;

heating the $Si_nH_{(2n+2)}$ reactant prior to flowing through the catalyst;

flowing the $Si_aH_{(2a+2)}$ reactant through a reactor containing the catalyst;

flowing the $Si_aH_{(2a+2)}$ reactant through a reactor containing the catalyst on glass wool;

flowing the $Si_aH_{(2a+2)}$ reactant through a reactor containing the catalyst pellets;

flowing the $Si_aH_{(2a+2)}$ reactant through a reactor containing the catalyst to produce a $Si_nH_{(2n+2)}$ mixture;

the $Si_aH_{(2a+2)}$ reactant having a residence time in the reactor ranging from approximately 200 seconds to approximately 600 seconds;

heating the reactor to a temperature ranging from approximately 15° C. to approximately 170° C.;

heating the reactor to a temperature ranging from approximately 15° C. to approximately 150° C.;

heating the reactor to a temperature ranging from approximately 15° C. to approximately 100° C.;

heating the reactor to a temperature ranging from approximately 15° C. to approximately 50° C.;

heating the reactor to a temperature ranging from approximately 20° C. to approximately 150° C.;

heating the reactor to a temperature ranging from approximately 50° C. to approximately 100° C.;

heating the reactor to a temperature ranging from approximately 40° C. to approximately 150° C.;

maintaining the reactor at a pressure ranging from approximately 10 psig (69 kPa) to approximately 50 psig (345 kPa);

recycling unreacted $Si_aH_{(2a+2)}$ reactant;

the catalyst being on a support;

the catalyst being physically bound to a support;

the catalyst being chemically bound to a support;

the catalyst being both physically and chemically bound to a support;

the support being alumina ($Al_2O_3$), silica ($SiO_2$), or combinations thereof;

the support being alumina ($Al_2O_3$);

the support being silica ($SiO_2$);

the catalyst being in pellet form;

the catalyst comprising approximately 0.1% w/w to approximately 70% w/w of the catalyst and support combination;

the catalyst comprising approximately 1% w/w to approximately 5% w/w of the catalyst and support combination;

fractionally distilling $Si_nH_{(2n+2)}$ to produce a Si-containing film forming composition comprising approximately 95% w/w to approximately 100% w/w n-$Si_5H_{12}$;

fractionally distilling $Si_nH_{(2n+2)}$ to produce a Si-containing film forming composition comprising approximately 95% w/w to approximately 100% w/w n-$Si_6H_{14}$;

fractionally distilling $Si_nH_{(2n+2)}$ to produce a Si-containing film forming composition comprising approximately 95% w/w to approximately 100% w/w n-$Si_7H_{16}$; and/or fractionally distilling $Si_nH_{(2n+2)}$ to produce a Si-containing film forming composition comprising approximately 95% w/w to approximately 100% w/w n-$Si_8H_{18}$.

Si-containing film forming composition produced by any of the methods disclosed above are also disclosed. The disclosed compositions may further include one or more of the following aspects:

the Si-containing film forming composition comprising approximately 95% w/w to approximately 100% w/w n-$Si_5H_{12}$;

the Si-containing film forming composition comprising approximately 95% w/w to approximately 100% w/w n-$Si_6H_{14}$;

the Si-containing film forming composition comprising approximately 95% w/w to approximately 100% w/w n-$Si_7H_{16}$;

the Si-containing film forming composition comprising approximately 95% w/w to approximately 100% w/w n-$Si_8H_{18}$;

the Si-containing film forming composition comprising approximately 0 ppmw to approximately 100 ppmw halide contaminants;

the Si-containing film forming composition comprising approximately 0 ppmw to approximately 25 ppmw halide contaminants; and/or the Si-containing film forming composition comprising approximately 0 ppmw to approximately 5 ppmw halide contaminants.

Methods of maintaining the vapor pressure of a volatile polysilane during vapor deposition processes are also disclosed. The vapor deposition processes use any of the Si-containing film forming composition disclosed above. The Si-containing film forming composition is maintained at a vaporizing temperature. The disclosed methods may further include one or more of the following aspects:

the Si-containing film forming composition comprising $Si_nH_{(2n+2)}$, wherein n=4-10;

the Si-containing film forming composition comprising approximately 90% w/w to approximately 100% w/w $Si_5H_{12}$;

the Si-containing film forming composition comprising approximately 90% w/w to approximately 100% w/w $Si_6H_{14}$;

the Si-containing film forming composition comprising approximately 90% w/w to approximately 100% w/w $Si_7H_{16}$;

the Si-containing film forming composition comprising approximately 90% w/w to approximately 100% w/w $Si_8H_{18}$;

the Si-containing film forming composition having an initial vapor pressure at the vaporizing temperature;

the vaporizing temperature ranging from approximately 0° C. to approximately 50° C.;

maintaining approximately 80% of the initial vapor pressure of the Si-containing film forming composition at the vaporizing temperature until approximately 75% w/w of Si-containing film forming composition is consumed; and/or maintaining approximately 90% of the initial vapor pressure of the Si-containing film forming composition at the vaporizing temperature until approximately 75% w/w of Si-containing film forming composition is consumed;

maintaining approximately 95% of the initial vapor pressure of the Si-containing film forming composition at the vaporizing temperature until approximately 75% w/w of Si-containing film forming composition is consumed.

Methods of reducing the formation of branched polysilanes during polymerization are also disclosed. The polymerization processes use any of the Si-containing film forming compositions disclosed above. The disclosed methods may further include one or more of the following aspects:

the Si-containing film forming composition comprising approximately 90% w/w to approximately 100% w/w $Si_5H_{12}$;

the Si-containing film forming composition comprising approximately 90% w/w to approximately 100% w/w $Si_6H_{14}$;

the Si-containing film forming composition comprising approximately 90% w/w to approximately 100% w/w $Si_7H_{16}$; and/or the Si-containing film forming composition comprising approximately 90% w/w to approximately 100% w/w $Si_8H_{18}$.

Also disclosed are coating methods of forming Si-containing films on substrates. The Si-containing film forming compositions disclosed above are contacted with the substrate and the Si-containing film formed via a spin coating, spray coating, dip coating, or slit coating technique. The disclosed methods may include the following aspects:

the Si-containing film forming composition further comprising between approximately 0.5% w/w to approximately 99.5% w/w of perhydropolysilazane;

the Si-containing film forming composition further comprising between approximately 10% w/w to approximately 90% w/w of perhydropolysilazane;

forming the Si-containing film via a spin coating technique;

forming the Si-containing film via a spray coating technique;

forming the Si-containing film via a dip coating technique;

forming the Si-containing film via a slit coating technique;

thermal curing the Si-containing film;

photon curing the Si-containing film;

annealing the Si-containing film;

laser treating the Si-containing film;

the Si-containing film being Si;

the Si-containing film being $SiO_2$;

the $SiO_2$ film having a wet etch rate ranging from approximately 1 to approximately 5 as compared to thermal oxide grown at 1100° C.;

the $SiO_2$ film having a wet etch rate ranging from approximately 1 to approximately 3 as compared to thermal oxide grown at 1100° C.;

the Si-containing film being SiN;

the Si-containing film being SiC;

the Si-containing film being SiON;

the substrate comprising trenches having an aspect ratio ranging from approximately 1:1 to approximately 1:100; and/or the trenches having a critical dimension ranging from approximately 10 nm to approximately 1 micron.

Notation and Nomenclature

Certain abbreviations, symbols, and terms are used throughout the following description and claims, and include:

As used herein, the indefinite article "a" or "an" means one or more.

As used herein, the terms "approximately" or "about" mean±10% of the value stated.

As used herein, the term "comprising" is inclusive or open-ended and does not exclude additional, unrecited materials or method steps; the term "consisting essentially of" limits the scope of a claim to the specified materials or steps and additional materials or steps that do not materially affect the basic and novel characteristics of the claimed invention; and the term "consisting of" excludes any additional materials or method steps not specified in the claim.

As used herein, the term "higher silanes" means $Si_nH_{2n+2}$, wherein n=4-100 and the term "lower silanes" means $Si_aH_{2a+2}$ with a=1-4. The higher silanes may be linear or branched.

As used herein, the term "catalyst" means a substance that increases the rate of a reaction without modifying the overall standard Gibbs energy change in the reaction. As used herein, the term "catalyst" includes substances that do not undergo any permanent chemical change as well as those that do (the latter sometimes referred to as "pre-catalysts").

As used herein, the term "heterogeneous catalyst" means a catalyst which is present in a different phase from the reactants (e.g., a solid catalyst versus a liquid reactant; or a liquid catalyst that is not capable of being mixed with a liquid reactant). The heterogeneous catalyst may be blended with a support, which is intrinsically inert or less active than the catalyst.

As used herein, the term "quenching agent" means a substance that deactivates a reaction.

As used herein, the term "residence time" means the amount of time the lower silane reactant spends in the flow through reactor.

As used herein, the terms "perhydropolysilazane" or "PHPS" mean a molecule, oligomer, or polymer containing only Si, H, and N characterized by repeating —$SiH_x$—NH— units, with x=0-2, and the fact that the silicon atom is only bonded to N or H atoms.

As used herein, the abbreviation "RT" means room temperature, which is a temperature ranging from approximately 18° C. to approximately 25° C.

As used herein, the term "hydrocarbyl group" refers to a functional group containing carbon and hydrogen; the term "alkyl group" refers to saturated functional groups containing exclusively carbon and hydrogen atoms. The hydrocarbyl group may be saturated or unsaturated. Either term refers to linear, branched, or cyclic groups. Examples of linear alkyl groups include without limitation, methyl groups, ethyl groups, propyl groups, butyl groups, etc. Examples of branched alkyls groups include without limitation, t-butyl. Examples of cyclic alkyl groups include without limitation, cyclopropyl groups, cyclopentyl groups, cyclohexyl groups, etc.

As used herein, the abbreviation "Me" refers to a methyl group; the abbreviation "Et" refers to an ethyl group; the abbreviation "Pr" refers to a propyl group; the abbreviation "nPr" refers to a "normal" or linear propyl group; the abbreviation "iPr" refers to an isopropyl group; the abbreviation "Bu" refers to a butyl group; the abbreviation "nBu" refers to a "normal" or linear butyl group; the abbreviation "tBu" refers to a tert-butyl group, also known as 1,1-dimethylethyl; the abbreviation "sBu" refers to a sec-butyl group, also known as 1-methylpropyl; the abbreviation "iBu" refers to an iso-butyl group, also known as 2-methylpropyl; the term "halide" refers to the halogen anions F—, Cl—, Br—, I—, and mixtures thereof; and the abbreviation "TMS" refers to trimethylsilyl or —$SiMe_3$.

As used herein, the term "aromatic group" refers to cyclic, planar molecules with a ring of resonance bonds that exhibit more stability than other geometric or connective arrangements with the same set of atoms. Exemplary aromatic groups include substituted or unsubstituted phenyl groups (i.e., $C_6R_5$, wherein each R is independently H or a hydrocarbyl group).

As used herein, the term "independently" when used in the context of describing R groups should be understood to denote that the subject R group is not only independently selected relative to other R groups bearing the same or different subscripts or superscripts, but is also independently selected relative to any additional species of that same R group. For example in the formula $MR^1_x(NR^2R^3)_{(4-x)}$, where x is 2 or 3, the two or three $R^1$ groups may, but need not be identical to each other or to $R^2$ or to $R^3$. Further, it should be understood that unless specifically stated otherwise, values of R groups are independent of each other when used in different formulas.

As used herein, the abbreviation $M_n$ stands for the number averaged molecular weight or the total weight of all of the polymer molecules in a sample divided by the total number of polymer molecules in the sample (i.e., $M_n = \Sigma N_i M_i / \Sigma N_i$, wherein $N_i$ is the number of molecules of weight $M_i$); the abbreviation $M_w$ stands for weight averaged molecular weight or the sum of the weight fraction of each type of molecule multiplied by the total mass of each type of molecule (i.e., $M_w = \Sigma[(N_i M_i / \Sigma N_i M_i) * N_i M_i]$; and the term "Poly Dispersity Index" or PDI means the ratio of $M_w : M_n$.

The standard abbreviations of the elements from the Periodic Table of elements are used herein. It should be understood that elements may be referred to by these abbreviations (e.g., Si refers to silicon, C refers to carbon, H refers to hydrogen, etc.).

As used herein, the Periodic Table refers to the tabular arrangement of chemical elements; Group I of the Periodic Table refers to H, Li, Na, K, Rb, Cs, and Fr. Group II of the Periodic Table refers to Be, Mg, Ca, Sr, Ba, and Ra. Group III of the Periodic Table refers to B, Al, Ga, In, Tl, and Nh.

Any and all ranges recited herein are inclusive of their endpoints (i.e., x=1 to 4 or x ranges from 1 to 4 includes x=1, x=4, and x=any number in between), irrespective of whether the term "inclusively" is used.

BRIEF DESCRIPTION OF THE DRAWINGS

For a further understanding of the nature and objects of the present invention, reference should be made to the following detailed description, taken in conjunction with the accompanying drawing wherein:

For a further understanding of the nature and objects of the present invention, reference should be made to the following detailed description, taken in conjunction with the accompanying drawing in which reference numbers are used throughout uniformly, wherein:

FIG. 6 is Gel Permeation Chromatogram (GPC) of the nonvolatile liquid of Example 2.

DESCRIPTION OF PREFERRED EMBODIMENTS

Figure 1:
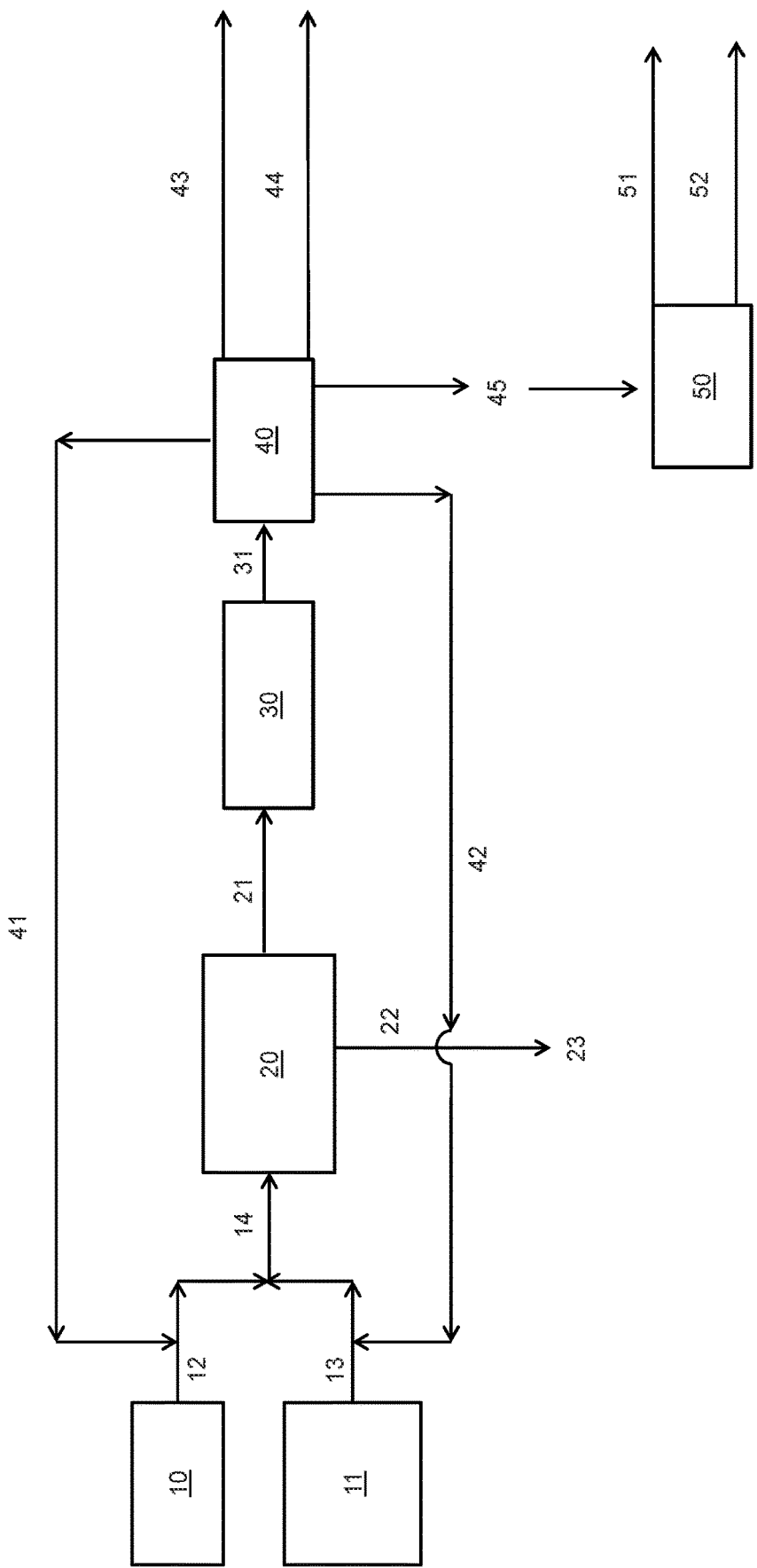
FIG. 1 is a schematic diagram of a batch apparatus in which the disclosed synthesis methods may be performed.

Methods of synthesizing higher silanes are disclosed (i.e., $Si_nH_{2n+2}$ with n=4-100). Methods of selectively synthesizing isomerically enriched polysilanes having the formula $Si_nH_{(2n+2)}$, wherein n=5-8, are also disclosed.

Higher silanes exist in various isomers with slight differences in vapor pressure. For example, the boiling point of 80-90% n-$Si_4H_{10}$ is 107° C. according to the online catalog from Gelest. In contrast, the boiling point for i-$Si_4H_{10}$ is 101.7° C. Fehér et al., Inorg. Nucl. Chem. Lett., 1973, 9, 931.

In addition to different vapor pressures, the isomers may also have different evaporation behaviour, and thermal stability, due at least to different steric geometries. These differences may create a drift in any vapor processes if one isomer enriches over time. This effect has been demonstrated with other types of isomers (see, e.g., Mehwash Zia and Muhammad Zia-ul-Haq, Journal of Contemporary Research in Chemistry (2016) 1 (1): 34-41 [MP1]). As a result, supplying a higher silane precursor consisting essentially of one isomer, enriched with one isomer, or having a fixed isomer ratio is important for having a reproducible rate of film growth per cycle in vapor deposition processes.

Similarly, polymerization using the different isomers may produce different polymerization products. In other words, iso-tetrasilane may produce a polymer having more branching than one produced by n-tetrasilane.

Applicants have discovered methods of tuning and optimizing the tetrasilane isomer ratio as well as selective preparation of polysilanes with a low amount of silicon atoms (6-30). The pure isomers or isomer enriched mixtures are prepared by catalytic transformation of silane ($SiH_4$), disilane ($Si_2H_6$), trisilane ($Si_3H_8$), tetrasilane ($Si_4H_{10}$), or mixtures thereof. The lower silane reactants (i.e., $Si_aH_{2a+2}$, with a=1-4) provide an attractive starting material due to commercial availability. Various process parameters may be adjusted to produce the desired isomer quantity. Exemplary process parameters include the relative amount of the starting compounds and catalyst selection. Temperature and reaction time for a batch process or residence time in a flow through process may also impact isomer yield. The resulting higher silane products are isomer content specific and high purity. One of ordinary skill in the art will recognize that safety protocols are required when working with these reactants and products.

The higher silanes are synthesized by reacting a $Si_aH_{(2a+2)}$ reactant, wherein a=1-4, with a $B(C_6F_5)_3$ catalyst. The $Si_aH_{(2a+2)}$ reactant may be $SiH_4$, $Si_2H_6$, $Si_3H_8$, $Si_4H_{10}$, or combinations thereof. These reactants are available commercially. These reactants may be used in the disclosed processes in gaseous or liquid form or, for a mixture, as a combination. For example, the reactant may be gaseous $Si_3H_8$ and liquid $Si_4H_{10}$.

In the examples that follow, the $Si_aH_{(2a+2)}$ reactant is gaseous or liquid $Si_3H_8$ or a mixture of liquid $Si_3H_8$ with liquid $Si_2H_6$ or $Si_4H_{10}$. The examples demonstrate that the use of liquid $Si_3H_8$ produces better n-$Si_4H_{10}$/i-$Si_4H_{10}$ selectivity as compared to the use of gaseous $Si_3H_8$. Liquid $Si_3H_8$ also produces larger heavier polysilanes ($Si \geq 6$) than those produced by gaseous $Si_3H_8$. As a result, synthesis of the desired polysilane may be optimized by selecting the appropriate $Si_aH_{(2a+2)}$ reactant. Some optional reactant combinations that will reduce the number of heavier polysilanes include between approximately 0.1% w/w to approximately 60% w/w $Si_3H_8$ and between approximately 40% w/w and 99.9% w/w $Si_2H_6$; between approximately 0.1% w/w to approximately 25% w/w $Si_3H_8$ and between approximately 75% w/w and 99.9% w/w $Si_2H_6$; or between approximately 0.1% w/w to approximately 10% w/w $Si_3H_8$ and between approximately 90% w/w and 99.9% w/w $Si_2H_6$. Some optional reactant combinations that will produce a larger number of heavier polysilanes include between approximately 0.1% w/w to approximately 60% w/w $Si_4H_{10}$ and between approximately 40% w/w and 99.9% w/w $Si_3H_8$; between approximately 0.1% w/w to approximately 25% w/w $Si_4H_{10}$ and between approximately 75% w/w and 99.9% w/w $Si_3H_8$; or between approximately 0.1% w/w to approximately 10% w/w $Si_4H_{10}$ and between approximately 90% w/w and 99.9% w/w $Si_3H_8$.

The $B(C_6F_5)_3$ catalysts may be located on a support. Exemplary supports include alumina ($Al_2O_3$), silica ($SiO_2$), or combinations thereof. One of ordinary skill in the art will recognize that the catalyst may be physically and/or chemically bound to the support. For example, the catalyst may chemically react with the —OH groups on the silica or alumina supports. Alternatively, the catalyst and support may simply be physically mixed together with no chemical reaction occurring. In another alternative, physically mixing the catalyst and support may result in both physical and chemical bonding. The catalyst may comprise between approximately 0.1% w/w to approximately 70% w/w of the total catalyst and support combination, and preferably from approximately 1% w/w to approximately 10% w/w of the total catalyst and support combination.

Alternatively, the catalyst may be commercially supplied in pellet form.

As shown in the examples that follow, the claimed catalyst permits more control of the polymerization process than the prior art transition metal catalysts of Group IV (Ti, Zr, Hf), VIII (Ru), IX (Co, Rh, Ir), and X (Ni, Pd, Pt) and the Lanthanides (Nd).

Catalysis of the lower silane reactants (i.e., $Si_aH_{2a+2}$, with a=1-4) occurs when the lower silane reactant contacts the $B(C_6F_5)_3$ catalyst. The reaction may occur in a batch reactor or flow through reactor. The lower silane reactant and catalyst may be mixed in a batch reactor to form a reactant-catalyst mixture. Depending on the reactant and catalyst, the reactant-catalyst mixture may be mixed for a time period ranging from approximately 1 hour to approximately 24 hours.

The batch reaction may be performed at a temperature ranging from approximately room temperature to approximately 53° C. Alternatively, the reaction may be performed at a temperature ranging from approximately 15° C. to approximately 50° C. In another alternative, the reaction may be performed at a temperature ranging from approximately 15° C. to approximately 30° C. One of ordinary skill in the art will recognize that the reaction temperature will vary depending upon the selected catalyst as well as the desired $Si_nH_{(2n+2)}$ product. The $Si_nH_{(2n+2)}$ product may be filtered to remove solids, such as the catalyst and/or any solid $Si_nH_{(2n+2)}$ product.

In a flow reactor, the $Si_aH_{(2a+2)}$ reactant may flow through a reactor containing catalyst pellets or catalyst supported on glass wool. The $Si_aH_{(2a+2)}$ reactant may have a residence time in the reactor ranging from approximately 200 second to approximately 600 seconds. The pressure in the reactor may range from approximately 10 psig (69 kPa) to approximately 50 psig (345 kPa).

The flow reaction may be performed at a temperature ranging from approximately 15° C. to approximately 170° C. Alternatively, the reaction may be performed at a temperature ranging from approximately 15° C. to approximately 150° C. In another alternative, the reaction may be performed at a temperature ranging from approximately 15° C. to approximately 100° C. In another alternative, the reaction may be performed at a temperature ranging from approximately 15° C. to approximately 50° C. In another alternative, the reaction may be performed at a temperature ranging from approximately 20° C. to approximately 150° C. In another alternative, the reaction may be performed at a temperature ranging from approximately 50° C. to approximately 100° C. One of ordinary skill in the art will recognize that the reaction temperature will vary depending upon the selected catalyst as well as the desired $Si_nH_{(2n+2)}$ product. As shown in Table 1 of Example 1, higher temperatures tend to produce heavier polysilanes ($Si \geq 6$).

The catalyst transforms the lower silane reactant to a $Si_nH_{(2n+2)}$ mixture, wherein n=1-100. Preferably, the catalyst converts approximately 20% w/w to approximately 60% w/w of the lower silane reactant. The desired polysilane is isolated from the $Si_nH_{(2n+2)}$ mixture. When n=5-8, an isomerically enriched polysilane having a ratio of one isomer to another isomer ranging from approximately 2:1 to approximately 15:1 may be fractionally distilled from the $Si_nH_{(2n+2)}$ mixture to produce a Si-containing film forming composition comprising approximately 95% w/w to approximately 100% w/w n-$Si_5H_{12}$, n-$Si_6H_{14}$, n-$Si_7H_{16}$, or n-$Si_8H_{18}$, and preferably from approximately 98% w/w to approximately 100% w/w n-$Si_5H_{12}$, n-$Si_6H_{14}$, n-$Si_7H_{16}$, or n-$Si_8H_{18}$.

One of ordinary skill in the art will recognize that the reaction rate and product yield will vary depending on whether the lower silane reactant is substituted or not. The reaction products produced by the claimed unsubstituted lower silanes (i.e., $Si_aH_{(2a+2)}$, with a=1-4) will differ from those produced by a substituted silane containing one or more organic groups (i.e., $Si_nR_xH_{(2n+2-x)}$, with R is an organic group and x is 1 or more). See Comparative Examples 1 and 2, which demonstrate that Ru/C and Rh/C are not active for transformation of non-substituted liquid or gaseous trisilane, respectively, even though U.S. Pat. No. 5,700,400 to Nippon Oil Co, Ltd., discloses the use of Ru and Rh catalyst.

The catalysis reaction may be performed in the presence or absence of unreactive gases, such as $H_2$, $N_2$, Ar or He. The unreactive gases may be used to maintain an inert atmosphere. The unreactive gases may also be used to dilute the reaction mixture. The unreactive gases may also be used to help maintain the flow of the reaction mixture within a desired range, for example from approximately 0.1 to approximately 1,000 mL/min, alternatively from approximately 1 to approximately 10 mL/min. Of course, the addition of these unreactive gases further requires their removal from the reaction product. Therefore, in another alternative and as demonstrated in the examples that follow, the catalysis reaction may be performed under the vapor pressure of the reactants.

FIG. 1 is a diagram of an exemplary batch process system for catalytic conversion of the lower silane reactants to the $Si_nH_{(2n+2)}$, wherein n=4-100, mixture. In FIG. 1, trisilane 10 and optionally disilane or tetrasilane 11 are used as the lower silane reactants. The catalysis may be performed under an inert atmosphere, such as $N_2$, a noble gas (i.e., He, Ne, Ar, Kr, Xe), or combinations thereof. Any and all air must be removed from various parts of the system (e.g., reactor 20, distillation unit 40, distillation unit 50, etc.) by applying a vacuum and/or inert gas cycles. The inert gas may also serve to pressurize the trisilane 10 and optional disilane or tetrasilane 11 to assist in delivery of the reactants to the reactor 20. Liquid nitrogen, refrigerated ethanol, an acetone/dry ice mixture, or heat transfer agents such as monoethylene glycol (MEG) or the heat transfer fluid sold under the trademark SYLTHERM™ by Dow Corning Corp. may be used to cool various parts of the system (e.g., distillation set up 40, distillation set up 50).

The $Si_3H_8$ reactant 10 and optional $Si_2H_6$ or $Si_4H_{10}$ reactant 11 are added to reactor 20 via lines 12 and 13, respectively. The reactor 20 contains the catalyst (not shown). The reactor 20 also includes a stirring mechanism (not shown), such as a paddle mixer or homogenizer. The reactor 20 may also be equipped with multiple "injection ports," pressure gauges, diaphragm valves (not shown).

The reactor 20 and any and all components that come into contact with the trisilane 10 and optional disilane or tetrasilane 11 reactants and any products and by-products ("contact components") must be clean and air- and moisture-free to prevent unintended reactions and/or contamination of the polysilane product 45. The reactor 20 and other contact components must be free of any impurities that may react with or contaminate the silanes. The reactor 20 and other contact components must also be compatible with the trisilane 10 and optional disilane or tetrasilane 11 reactants and products and by-products.

Exemplary reactors 20 include stainless steel canisters having low surface roughness and mirror finish. The low surface roughness and mirror finish may be obtained by mechanical polishing and/or by electropolishing. High purity may be obtained by treatments that include, but are not limited to, (a) cleaning steps using dilute acids (HF, $HNO_3$) or bases (KOH, NaOH); followed by (b) rinsing with high purity de-ionized water to ensure the complete removal of traces of the acid or base; followed by (c) drying the reactor 20. Completion of the deionized water (DIW) rinse (step b) may be indicated when the conductivity of the rinse water reaches 100 μS/cm, and preferably below 25 μS/cm.

The drying step may include purging with an inert gas such as He, $N_2$, Ar (preferably $N_2$ or Ar); reducing the pressure in the reactor 20 or other contact components to accelerate outgassing from the surface; heating the reactor 20 or other contact components, or any combination thereof. The drying step may comprise alternate sequences of purges, during which a certain flow of inert gas is flown through the vessel, and vacuuming steps. Alternatively, the drying step may be carried out by constantly flowing a purge gas while maintaining a low pressure in the reactor 20 or other contact components. The drying efficiency and end point may be assessed by measuring the trace $H_2O$ level in the gas emerging from the reactor 20 or other contact component. With an inlet gas having less than 10 ppb $H_2O$, the outlet gas should have a moisture content ranging from approximately 0 ppm to approximately 10 ppm, preferably ranging from approximately 0 ppm to approximately 1 ppm, and more preferably ranging from approximately 0 ppb to approximately 200 ppb. During the purge steps and vacuum steps, heating the reactor 20 or other contact component is known to accelerate the drying time. Reactors 20 are typically maintained at a temperature ranging from approximately 40° C. to approximately 150° C. during drying.

Once cleaned and dried, the reactor 20 must have a total leak rate below $1\times10^{-6}$ std cm³/s, preferably $<1\times10^{-8}$ std cm³/s.

Any gases used to prepare the system for catalysis or during the catalysis process must be of semiconductor grade (i.e. free of contaminants such as trace moisture and oxygen (<1 ppm, preferably <10 ppb), and particles (<5 particles per litre @ 0.5 μm)).

The reactor 20, the source vessels of trisilane 10 and optional disilane or tetrasilane 11, the polysilane product containers, and any other contact components may also be passivated by exposure to a silylating agent such as silane, disilane, or trisilane prior to the reaction. Passivation helps minimize reaction between the lower or higher silanes and the material that has been passivated.

As shown in FIG. 1, the $Si_3H_8$ reactant 10 and optional $Si_2H_6$ or $Si_4H_{10}$ reactant 11 may be mixed in line 14 before introduction into air- and moisture-free reactor 20. Alternatively, the $Si_3H_8$ reactant 10 and optional $Si_2H_6$ or $Si_4H_{10}$ reactant 11 may be directly introduced into reactor 20 via lines 12 and 13 (not shown). The $Si_3H_8$ reactant 10 and optional $Si_2H_6$ or $Si_4H_{10}$ reactant 11 may be added to the reactor 20 via a liquid metering pump (not shown), such as a diaphragm pump, peristaltic pump, or syringe pump.

Upon completion of the addition of the $Si_3H_8$ reactant 10 and optional $Si_2H_6$ or $Si_4H_{10}$ reactant 11, the reactor 20 may be heated to a temperature ranging from approximately 25° C. to approximately 150° C. or alternatively from approximately 15° C. to approximately 100° C. The reactor 20 may be maintained at the desired temperature by a jacket (not shown). The jacket may have an inlet and outlet (not shown). Inlet and outlet may be connected to a heat exchanger/chiller (not shown) and/or pump (not shown) to provide recirculation of a heating or cooling fluid. Alternatively, the temperature of the reactor 20 may be maintained using heating tape (not shown) or a heating mantle (not shown), with the heating elements connected to a temperature controlling unit (not shown). A temperature sensor (not shown) may be used to monitor the temperature of the contents of the reactor 20.

The lower silane reactant and catalyst may be stirred for a time period ranging from approximately 0.1 hour to approximately 72 hours, alternatively from approximately 1 hour to approximately 30 hours. The mixing may be performed at approximately atmospheric pressure. The progress of the reaction may be monitored using, for example, gas chromatography. The predominant reaction products are $SiH_4$, $Si_5H_{12}$, etc.

Upon completion of the reaction, the reactor 20 is cooled to approximately room temperature. When the reactor 20 is jacketed, any heating fluid may be replaced with a cooling fluid to assist in cooling the reactor 20 and its contents. Liquid nitrogen, refrigerated ethanol, an acetone/dry ice mixture, or heat transfer agents may be used to cool the reactor 20. Alternatively, any heating mechanism, such as heating tape or a heating mantel, may be turned off and natural cooling may occur. Any heavier liquid non-volatile silanes 23 are filtered from the catalyst and solid reaction products and removed from the reactor 20 via line 22. The volatile silanes 21 are stripped from reactor 20 by pressure difference.

The volatile silanes 21 may be collected in one or more traps 30 to produce a $Si_nH_{(2n+2)}$ mixture 31, wherein n=1-100. Exemplary traps 30 include a dry ice/isopropanol, dry ice/acetone, refrigerated ethanol, and/or liquid nitrogen trap. The $Si_nH_{(2n+2)}$ mixture 31 may be collected in one or more containers and transported to a new location prior to performance of the next process steps. Alternatively, the mixture 31 may immediately be directed to a distillation unit 40 to further isolate the reaction product from any reactants and reaction by-products. The distillation unit 40 separates the desired polysilane product 45 from the $SiH_4$ reaction by-product 43, the volatile $Si_nH_{2n+2}$ with n≥5 reaction by-products 44, and any unreacted $Si_3H_8$ reactant 41 and unreacted optional $Si_2H_6$ or $Si_4H_{10}$ reactant 42. The unreacted $Si_3H_8$ reactant 41 and unreacted optional $Si_2H_6$ or $Si_4H_{10}$ reactant 42 may be recycled for use in future processes.

Once again, the polysilane product 45 may be transported to a new location prior to performance of the next process steps. Alternatively, the polysilane product 45 may be directed to a fractional distillation unit 50 to separate the n-isomer 51 from other isomers 52. The fractional distillation may be performed using a static column or a spinning band column. The length of the spinning band distillation column is much smaller than that of the static column and may be preferred for use in crowded facilities because it takes up less space. A static column suitable to produce approximately 90% n-tetrasilane would require between approximately 90 to approximately 120 theoretical plates and would be approximately 6 to 7 meters tall.

Figure 2:
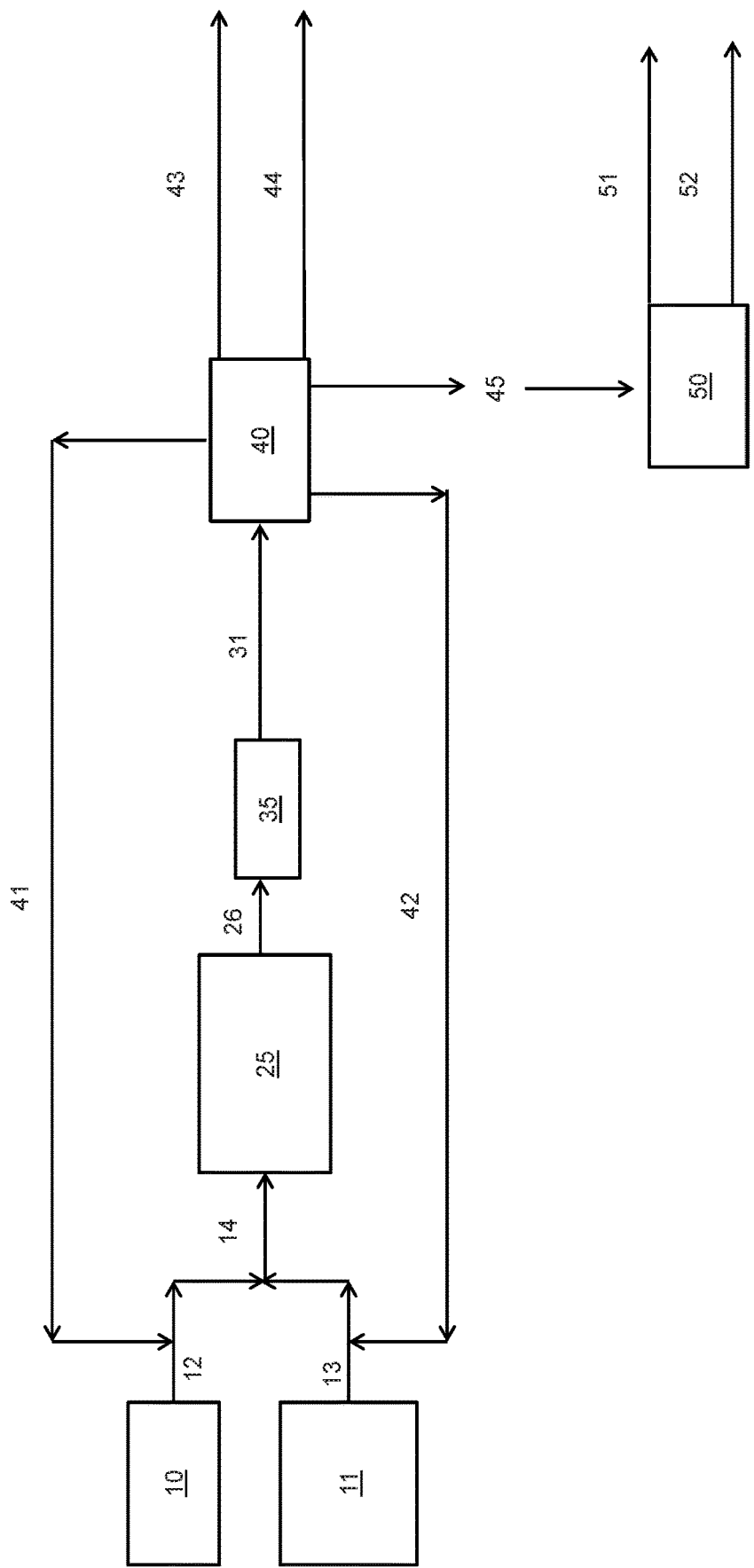
FIG. 2 is a schematic diagram of a flow-through apparatus in which the disclosed synthesis methods may be performed.

FIG. 2 is a diagram of the flow process for catalytic conversion of the lower silane reactants to the $Si_nH_{(2n+2)}$ mixture. The same references numbers from FIG. 1 have been used for the same components in FIG. 2. As in FIG. 1, all of the contact components of FIG. 2 must be clean and air- and moisture-free. As in FIG. 1, the catalysis of FIG. 2 may be performed under an inert atmosphere, such as $N_2$, a noble gas (i.e., He, Ne, Ar, Kr, Xe), or combinations thereof.

Trisilane 10 and optionally disilane or tetrasilane 11 are added to flow reactor 25 via lines 12 and 13, respectively. As in FIG. 1, the $Si_3H_8$ reactant 10 and optional $Si_2H_6$ or $Si_4H_{10}$ reactant 11 may be mixed in line 14 before introduction into flow reactor 25. Alternatively, the $Si_3H_8$ reactant 10 and optional $Si_2H_6$ or $Si_4H_{10}$ reactant 11 may be directly introduced into flow reactor 25 via lines 12 and 13 (not shown). The $Si_3H_8$ reactant 10 and optional $Si_2H_6$ or $Si_4H_{10}$ reactant 11 may be added to the flow reactor 25 via a liquid metering pump (not shown), such as a diaphragm pump, peristaltic pump, or syringe pump. Preferably, the mixing is performed under an inert atmosphere at approximately atmospheric pressure.

As will be provided in further detail in discuss of FIG. 4 below, the catalyst (not shown) is located within the flow reactor 25. The flow reactor 25 is maintained at a temperature ranging from approximately 25° C. to approximately 250° C., alternatively from approximately 40° C. to approximately 250° C. or, in another alternative, from approximately 50° C. to approximately 100° C. The temperature selected will depend upon the catalyst selected, as well as the target reaction products. The flow reactor 25 is maintained at a pressure ranging from approximately 0.1 atm to approximately 10 atm. The flow of the trisilane 10 and optionally disilane or tetrasilane 11 reactants is selected to provide approximately 0.01 to approximately 100 minutes of residence time in flow reactor 25, alternatively between approximately 2 minutes to approximately 20 minutes residence time, alternatively between approximately 1 second to approximately 1,000 seconds or, in another alternative, from approximately 100 seconds to approximately 600 seconds.

The $Si_nH_{(2n+2)}$ mixture 26, wherein n=1-100, is collected in a receiver 35 after passing the flow reactor 25. The receiver 35 may be any sort of trap, including but not limited to dry ice/isopropanol, dry ice/acetone, refrigerated ethanol, and/or liquid nitrogen traps.

As in FIG. 1 above, the $Si_nH_{(2n+2)}$ mixture 31 may be collected in one or more containers and transported to a new location prior to performance of the next process steps. Alternatively, the mixture 31 may immediately be directed to a distillation unit 40 to further isolate the reaction product from any reactants and reaction by-products. The distillation unit 40 separates the desired polysilane product 45 from the $SiH_4$ reaction by-product 43, the volatile $Si_nH_{2n+2}$ with n≥5 reaction by-products 44, and any unreacted $Si_3H_8$ reactant 41 and optional $Si_2H_6$ or $Si_4H_{10}$ reactant 42. The unreacted $Si_3H_8$ reactant 41 and unreacted optional $Si_2H_6$ or $Si_4H_{10}$ reactant 42 may be recycled. Real time analysis and purification of the unreacted $Si_3H_8$ reactant 41 and unreacted optional $Si_2H_6$ or $Si_4H_{10}$ reactant 42 may be provided to maintain quality during this continuous synthesis process, such as filters and/or in-situ GC analysis.

Once again, the polysilane product 45 may be transported to a new location 102 prior to performance of the next process steps. Alternatively, the polysilane product 45 may be directed to a fractional distillation unit 50 to separate the n-isomer 51 from other isomers 52. The fractional distillation may be formed with a static column or a spinning band column. The spinning band distillation column length is much smaller than that of the static column and may be preferred for use in crowded facilities because it takes up less space. A static column suitable to produce approximately 90% n-tetrasilane would require between approximately 90 to approximately 120 theoretical plates and would be approximately 6 to 7 meters tall.

Figure 3:
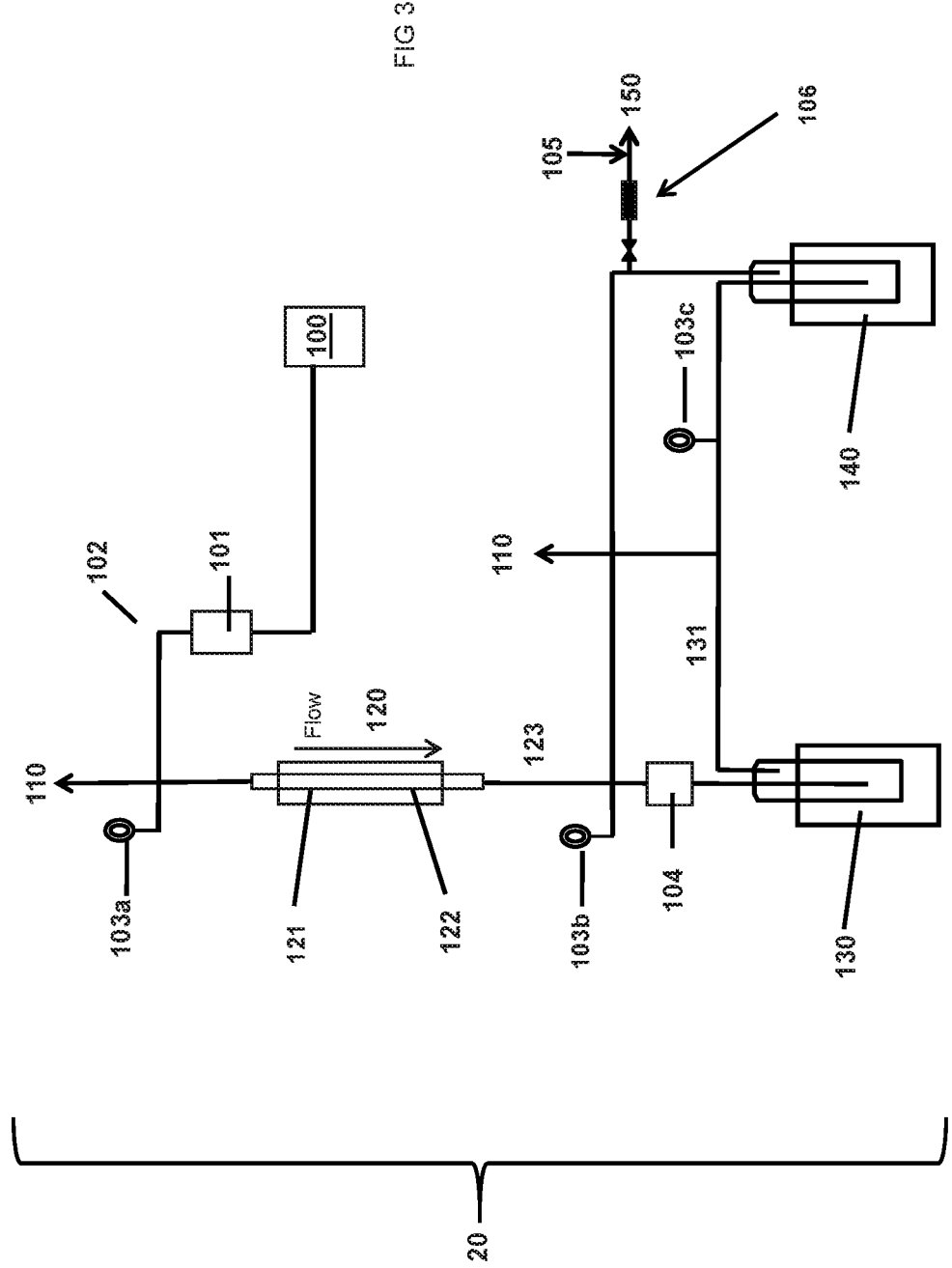
FIG. 3 is a schematic diagram of one embodiment of the flow-through apparatus of FIG. 2.

FIG. 3 is a diagram of the flow reactor 20 of FIG. 2. Please note that valves have not been included in this figure to make the figure easier to read.

The $Si_aH_{(2a+2)}$ reactant 100 is pressurized with nitrogen in order to supply the $Si_aH_{(2a+2)}$ reactant to the flow reactor 120 via line 102. Line 102 is also connected to vacuum 110. A flow regulator 101 controls the flow of the $Si_aH_{(2a+2)}$ reactant. The flow regulator 101 may be a graduated needle valve, electronic flow meter, etc. A gauge 103a measures the pressure and may communicate with the flow regulator 101 to adjust accordingly.

Flow reactor 120 includes two thermocouples 121 and 122. More or fewer may be used without departing from the teachings herein. Exemplary thermocouples suitable for use in the teaching herein include Type K or Type J thermocouples.

The $Si_nH_{(2n+2)}$ reaction mixture exits the flow reactor 120 via line 123. Pressure regulator 104 sets the pressure in the reactor 120 and provides the pressure differential that moves the $Si_nH_{(2n+2)}$ reaction mixture from the flow reactor 120 to the dry ice/isopropanol trap 130. Gauge 103b indicates the pressure in the reactor 120. The dry ice/isopropanol trap 130 captures any $Si_nH_{(2n+2)}$ reaction products that condense above approximately −78° C.

Any volatile $Si_nH_{(2n+2)}$ reaction mixture that is not captured in the dry ice/isopropanol trap is condensed via line 131 to a liquid nitrogen trap 140. The liquid nitrogen trap 140 captures any $Si_nH_{(2n+2)}$ reaction products that condense below approximately −78° C. and approximately −196° C. Line 131 is also connected to vacuum line 110. Pressure gauge 103c monitors pressure in line 131. $SiH_4$ by-product is sent to an exhaust scrubber (not shown) via line 150. $N_2$ 105 is used to dilute the $SiH_4$ by-product on its way to the exhaust scrubber. Check valve 106 prevent backflow of this pyrophoric by-product.

Figure 4:
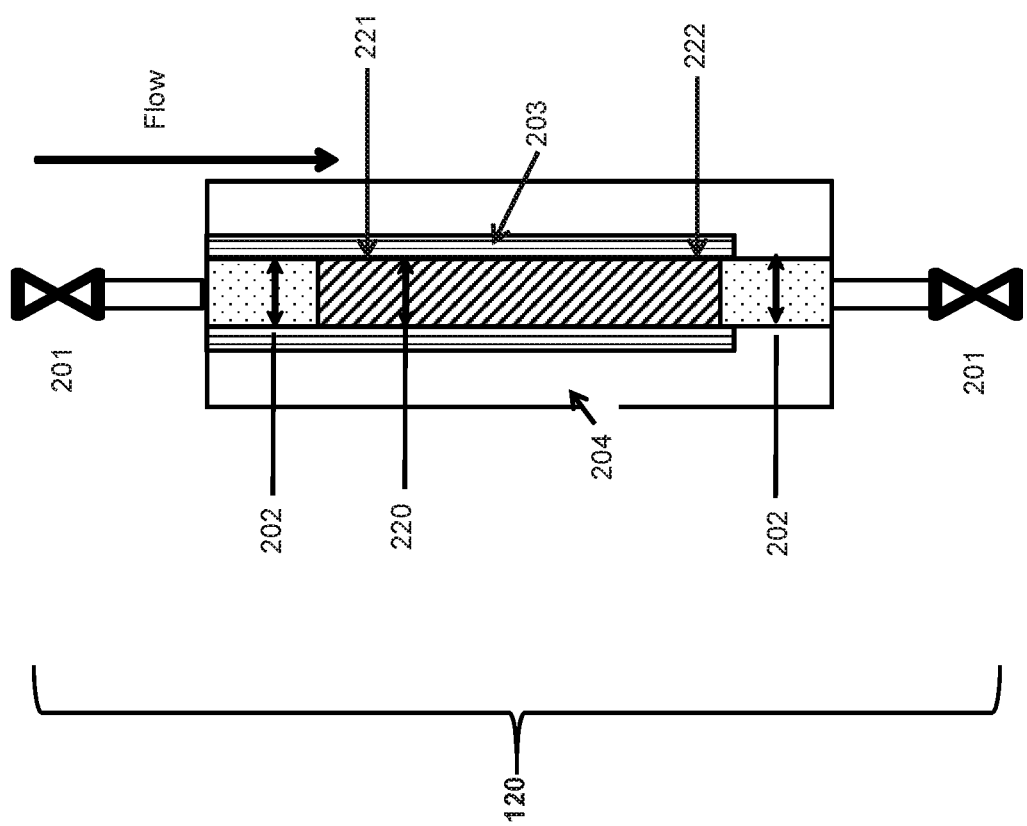
FIG. 4 is a schematic diagram of one embodiment of the reactor of FIG. 3.

FIG. 4 is a diagram of the flow reactor 120 of FIG. 3. In FIG. 4, valves 201 permit the stainless steel tube flow reactor 220 to be accessed for troubleshooting or preventative maintenance. The stainless steel tube flow reactor 220 includes two thermocouples 221 and 222. As in FIG. 3, more or fewer thermocouples may be used without departing from the teachings herein. Glass wool 202 is located at the beginning and the end of the stainless steel tube flow reactor 220. The catalyst (not shown) may be packed between the glass wool 202 located at the beginning and end of the reactor or located on glass wool (not shown) packed between the glass wool 202 at the beginning and end of the flow reactor 220. As a result, the $Si_nH_{(2n+2)}$ reactant may be heated prior to catalysis when it passes through the glass wool at the beginning of the flow reactor 220. One of ordinary skill in the art will recognize that a layer of glass beads and pellet catalysts may be used in place of the glass wool/catalyst mixture.

When necessary, heating tape 203 provides heat to the stainless steel tube flow reactor 220. Thermal insulation 204 helps to maintain the temperature of the stainless steel tube flow reactor 220. One of ordinary skill in the art will recognize that alternative heating means may also be used without departing from the teachings herein. For example, the stainless steel tube flow reactor 220 may alternatively be placed in an oven (not shown). In that embodiment, thermal insulation 204 would not be needed.

One of ordinary skill in the art will recognize the sources for the equipment components of the systems used to practice the disclosed methods. Some level of customization of the components may be required based upon the desired temperature range, pressure range, local regulations, etc. Exemplary equipment suppliers include Parr Instrument Company equipment and components made from stainless steel.

Fractional distillation of the desired polysilane product (50 in FIGS. 1 and 2) produces a Si-containing film forming composition comprising between approximately 90% w/w to approximately 100% w/w n-$Si_5H_{12}$, n-$Si_6H_{14}$, n-$Si_7H_{16}$, or n-$Si_8H_{18}$, preferably between approximately 95% w/w to approximately 100% w/w n-$Si_5H_{12}$, n-$Si_6H_{14}$, n-$Si_7H_{16}$, or n-$Si_8H_{18}$, and more preferably between approximately 97% w/w to approximately 100% w/w n-$Si_5H_{12}$, n-$Si_6H_{14}$, n-$Si_7H_{16}$, or n-$Si_8H_{18}$. The Si-containing film forming compositions further comprises between approximately 0% w/w to approximately 10% w/w of non n-isomers, preferably between approximately 0% w/w to approximately 5% w/w non n-isomers; and more preferably between approximately 0% w/w to approximately 3% w/w non n-isomers. For example, after fractional distillation of approximately 192 grams of a 3:1 n-$Si_4H_{10}$:i-$Si_4H_{10}$ mixture using a 1 cm diameter and 100 cm long spinning band distillation column, Applicants have been able to produce approximately 90% w/w to approximately 95% w/w n-tetrasilane. One of ordinary skill in the art will recognize that higher purity n-tetrasilane would be obtained from mixtures having higher n-$Si_4H_{10}$:i-$Si_4H_{10}$ ratio and/or larger distillation columns.

The Si-containing film forming composition has a purity ranging from approximately 97% mol/mol to approximately 100% mol/mol, preferably from approximately 99% mol/mol to approximately 100% mol/mol, more preferably from approximately 99.5% mol/mol to approximately 100% mol/mol, and even more preferably from approximately 99.97% mol/mol to approximately 100% mol/mol.

The Si-containing film forming compositions preferably comprise between the detection limit and 100 ppbw of each potential metal contaminant (e.g., at least Ag, Al, Au, Ca, Cr, Cu, Fe, Mg, Mo, Ni, K, Na, Sb, Ti, Zn, etc.).

The concentration of X (wherein X=Cl, Br, or I) in the Si-containing film forming compositions may range from approximately 0 ppmw to approximately 100 ppmw, and more preferably from approximately 0 ppmw and to approximately 10 ppmw.

As shown in the examples below, the purified product may be analyzed by gas chromatography mass spectrometry (GCMS). The structure of the product may be confirmed by $^1H$ and/or $^{29}Si$ NMR.

As discussed in detail above and illustrated in the examples that follow, the Si-containing film forming composition must be stored in a clean dry storage vessel with which it does not react in order to maintain its purity.

The advantages of the disclosed synthesis methods are as follows:
- Lower process temperature and higher yield of the desired polysilane compared to pyrolysis process, which helps reduce cost and product isolation issues;
- The process is solventless;
- Purification only by distillation;
- The waste generation is minimal and environmentally benign; and
- Many of the starting materials are inexpensive and readily available.

All of the above are advantageous from the standpoint of developing a scalable industrial process.

Also disclosed are methods of using the disclosed Si-containing film forming compositions for vapor deposition methods. The disclosed methods provide for the use of the Si-containing film forming compositions for deposition of silicon-containing films, such as an elemental silicon film for fabrication of electronic or optoelectronic devices or circuits. The disclosed methods may be useful in the manufacture of semiconductor, photovoltaic, LCD-TFT, or flat panel type devices. The method includes: introducing the vapor of the disclosed Si-containing film forming compositions into a reactor having a substrate disposed therein and depositing at least part of the disclosed Si-containing film forming composition onto the substrate via a deposition process to form a Si-containing layer.

The disclosed methods also provide for forming a bimetal-containing layer on a substrate using a vapor deposition process and, more particularly, for deposition of $SiMO_x$ or $SiMN_x$ films, wherein x may be 0-4 and M is Ta, Nb, V, Hf, Zr, Ti, Al, B, C, P, As, Ge, lanthanides (such as Er), or combinations thereof.

The disclosed methods of forming silicon-containing layers on substrates may be useful in the manufacture of semiconductor, photovoltaic, LCD-TFT, or flat panel type devices. The disclosed Si-containing film forming composition may deposit Si-containing films using any vapor deposition methods known in the art. Examples of suitable vapor deposition methods include chemical vapor deposition (CVD) or atomic layer deposition (ALD). Exemplary CVD methods include thermal CVD, plasma enhanced CVD (PECVD), pulsed CVD (PCVD), low pressure CVD (LPCVD), sub-atmospheric CVD (SACVD), atmospheric pressure CVD (APCVD), flowable CVD (f-CVD), metal organic chemical vapor deposition (MOCVD), hot-wire CVD (HWCVD, also known as cat-CVD, in which a hot wire serves as an energy source for the deposition process), radicals incorporated CVD, and combinations thereof. Exemplary ALD methods include thermal ALD, plasma enhanced ALD (PEALD), spatial isolation ALD, hot-wire ALD (HWALD), radicals incorporated ALD, and combinations thereof. Super critical fluid deposition may also be used. Among these, thermal CVD deposition is preferred for a process in which a high deposition rate, excellent film uniformity, and conformal film quality are required. Thermal ALD deposition is preferred for a process that forms a film having the high uniformity under severe conditions (e.g., trenches, holes, or vias). In one alternative, a PECVD deposition is preferred, particularly when fast growth, conformality, process-orientation and one direction films are required. In another alternative, a PEALD deposition process is preferred, particularly when superior conformality of films deposited on challenging surfaces (e.g., trenches, holes, and vias) is required.

The vapor of the Si-containing film forming composition is introduced into a reaction chamber containing a substrate. The temperature and the pressure within the reaction chamber and the temperature of the substrate are held at conditions suitable for vapor deposition of at least part of the Si-containing film forming composition onto the substrate. In other words, after introduction of the vaporized composition into the chamber, conditions within the chamber are such that at least part of the vaporized precursor deposits onto the substrate to form the silicon-containing film. A co-reactant may also be used to help in formation of the Si-containing layer.

The reaction chamber may be any enclosure or chamber of a device in which deposition methods take place, such as, without limitation, a parallel-plate type reactor, a cold-wall type reactor, a hot-wall type reactor, a single-wafer reactor, a multi-wafer reactor, or other such types of deposition systems. All of these exemplary reaction chambers are capable of serving as an ALD reaction chamber. The reaction chamber may be maintained at a pressure ranging from about 0.5 mTorr to about 760 Torr. In addition, the temperature within the reaction chamber may range from about 20☐ C to about 700☐ C. One of ordinary skill in the art will recognize that the temperature may be optimized through mere experimentation to achieve the desired result.

The temperature of the reactor may be controlled by either controlling the temperature of the substrate holder and/or controlling the temperature of the reactor wall. Devices used to heat the substrate are known in the art. The reactor wall may be heated to a sufficient temperature to obtain the desired film at a sufficient growth rate and with desired physical state and composition. A non-limiting exemplary temperature range to which the reactor wall may be heated includes from approximately 20° C. to approximately 700° C. When a plasma deposition process is utilized, the deposition temperature may range from approximately 20° C. to approximately 550° C. Alternatively, when a thermal process is performed, the deposition temperature may range from approximately 300° C. to approximately 700° C.

Alternatively, the substrate may be heated to a sufficient temperature to obtain the desired silicon-containing film at a sufficient growth rate and with desired physical state and composition. A non-limiting exemplary temperature range to which the substrate may be heated includes from 150° C. to 700° C. Preferably, the temperature of the substrate remains less than or equal to 500° C.

The type of substrate upon which the silicon-containing film will be deposited will vary depending on the final use intended. A substrate is generally defined as the material on which a process is conducted. The substrates include, but are not limited to, any suitable substrate used in semiconductor, photovoltaic, flat panel, or LCD-TFT device manufacturing. Examples of suitable substrates include wafers, such as silicon, silica, glass, Ge, or GaAs wafers. The wafer may have one or more layers of differing materials deposited on it from a previous manufacturing step. For example, the wafers may include silicon layers (crystalline, amorphous, porous, etc.), silicon oxide layers, silicon nitride layers, silicon oxy nitride layers, carbon doped silicon oxide (SiCOH) layers, or combinations thereof. Additionally, the wafers may include copper layers, tungsten layers or metal layers (e.g. platinum, palladium, nickel, rhodium, or gold). The wafers may include barrier layers, such as manganese, manganese oxide, tantalum, tantalum nitride, etc. The layers may be planar or patterned. In some embodiments, the substrate may be coated with a patterned photoresist film. In some embodiments, the substrate may include layers of oxides which are used as dielectric materials in MIM, DRAM, or FeRam technologies (for example, $ZrO_2$ based materials, $HfO_2$ based materials, $TiO_2$ based materials, rare earth oxide based materials, ternary oxide based materials, etc.) or from nitride-based films (for example, TaN) that are used as electromigration barrier and adhesion layer between copper and the low-k layer. The disclosed processes may deposit the silicon-containing layer directly on the wafer or directly on one or more than one (when patterned layers form the substrate) of the layers on top of the wafer. Furthermore, one of ordinary skill in the art will recognize that the terms "film" or "layer" used herein refers to a thickness of some material laid on or spread over a surface and that the surface may be a trench or a line. Throughout the specification and claims, the wafer and any associated layers thereon are referred to as substrates. The actual substrate utilized may also depend upon the specific precursor embodiment utilized. In many instances though, the preferred substrate utilized will be selected from hydrogenated carbon, TiN, SRO, Ru, and Si type substrates, such as polysilicon or crystalline silicon substrates.

The substrate may be patterned to include vias or trenches having high aspect ratios. For example, a conformal Si-containing film, such as SiN or $SiO_2$, may be deposited using any ALD technique on a through silicon via (TSV) having an aspect ratio ranging from approximately 20:1 to approximately 100:1.

When n=4-10, the Si-containing film forming compositions may be supplied neat. Alternatively, the Si-containing film forming compositions may further comprise a solvent suitable for use in vapor deposition. The solvent may be selected from, among others, $C_1$-$C_{16}$ saturated or unsaturated hydrocarbons.

For vapor deposition, the Si-containing film forming compositions are introduced into a reactor in vapor form by conventional means, such as tubing and/or flow meters. The vapor form may be produced by vaporizing the Si-containing film forming compositions through a conventional vaporization step such as direct liquid injection, direct vapor draw in the absence of a carrier gas, by bubbling a carrier gas through the liquid, or by sweeping the vapors with a carrier gas without bubbling through the liquid. The Si-containing film forming compositions may be fed in liquid state to a vaporizer (Direct Liquid Injection) where it is vaporized and mixed with a carrier gas before it is introduced into the reactor. Alternatively, the Si-containing film forming compositions may be vaporized by passing a carrier gas into a container containing the composition or by bubbling the carrier gas into the composition. The carrier gas may include, but is not limited to, Ar, He, or $N_2$, and mixtures thereof. The carrier gas and composition are then introduced into the reactor as a vapor.

If necessary, the Si-containing film forming composition may be heated to a temperature that permits the Si-containing film forming composition to have a sufficient vapor pressure. The delivery device may be maintained at temperatures in the range of, for example, 0-150° C. Those skilled in the art recognize that the temperature of the delivery device may be adjusted in a known manner to control the amount of Si-containing film forming composition vaporized.

In addition to the disclosed composition, a reaction gas may also be introduced into the reactor. The reaction gas may be an oxidizing agent such as $O_2$; $O_3$; $H_2O$; $H_2O_2$; $N_2O$; oxygen containing radicals such as $O^-$ or $OH^-$; NO; $NO_2$; carboxylic acids such as formic acid, acetic acid, propionic acid; radical species of NO, $NO_2$, or the carboxylic acids; para-formaldehyde; and mixtures thereof. Preferably, the oxidizing agent is selected from the group consisting of $O_2$, $O_3$, $H_2O$, $H_2O_2$, oxygen containing radicals thereof such as $O^-$ or $OH^-$, and mixtures thereof. Preferably, when an ALD process is performed, the co-reactant is plasma treated oxygen, ozone, or combinations thereof. When an oxidizing gas is used, the resulting silicon containing film will also contain oxygen.

Alternatively, the reaction gas may $H_2$, $NH_3$, $(SiH_3)_3N$, hydridosilanes (such as $SiH_4$, $Si_2H_6$, $Si_3H_8$, $Si_4H_{10}$, $Si_5H_{10}$, $Si_6H_{12}$), chlorosilanes and chloropolysilanes (such as $SiHCl_3$, $SiH_2Cl_2$, $SiH_3Cl$, $Si_2Cl_6$, $Si_2HCl_5$, $Si_3Cl_8$), alkylsilanes (such as $Me_2SiH_2$, $Et_2SiH_2$, $MeSiH_3$, $EtSiH_3$), hydrazines (such as $N_2H_4$, $MeHNNH_2$, $MeHNNHMe$), organic amines (such as $NMeH_2$, $NEtH_2$, $NMe_2H$, $NEt_2H$, $NMe_3$, $NEt_3$, $(SiMe_3)_2NH$), diamines such as ethylene diamine, dimethylethylene diamine, tetramethylethylene diamine, pyrazoline, pyridine, B-containing molecules (such as $B_2H_6$, trimethylboron, triethylboron, borazine, substituted borazine, dialkylaminoboranes), alkyl metals (such as trimethylaluminum, triethylaluminum, dimethylzinc, diethylzinc), radical species thereof, or mixtures thereof. When $H_2$ or an inorganic Si containing gas is used, the resulting silicon containing film may be pure Si.

Alternatively, the reaction gas may be a hydrocarbon, saturated or unsaturated, linear, branched or cyclic, such as but not limited to ethylene, acetylene, propylene, isoprene, cyclohexane, cyclohexene, cyclohexadiene, pentene, pentyne, cyclopentane, butadiene, cyclobutane, terpinene, octane, octene, or combinations thereof.

The reaction gas may be treated by a plasma, in order to decompose the reaction gas into its radical form. $N_2$ may also be utilized as a reducing agent when treated with plasma. For instance, the plasma may be generated with a power ranging from about 50 W to about 500 W, preferably from about 100 W to about 200 W. The plasma may be generated or present within the reactor itself. Alternatively, the plasma may generally be at a location removed from the reactor, for instance, in a remotely located plasma system. One of skill in the art will recognize methods and apparatus suitable for such plasma treatment.

The desired silicon-containing film also contains another element, such as, for example and without limitation, B, P, As, Zr, Hf, Ti, Nb, V, Ta, Al, Si, or Ge.

The Si-containing film forming composition and one or more co-reactants may be introduced into the reaction chamber simultaneously (chemical vapor deposition), sequentially (atomic layer deposition), or in other combinations. For example, the vapor of the Si-containing film forming composition may be introduced in one pulse and two additional metal sources may be introduced together in a separate pulse (modified atomic layer deposition). Alternatively, the reaction chamber may already contain the co-reactant prior to introduction of the Si-containing film forming composition. The co-reactant may be passed through a plasma system localized within or remote from the reaction chamber, and decomposed to radicals. Alternatively, the Si-containing film forming composition may be introduced to the reaction chamber continuously while other precursors or reactants are introduced by pulse (pulsed-chemical vapor deposition). In another alternative, the Si-containing film forming composition and one or more co-reactants may be simultaneously sprayed from a shower head under which a susceptor holding several wafers is spun (spatial ALD).

In one non-limiting exemplary atomic layer deposition process, the vapor phase of the Si-containing film forming composition is introduced into the reaction chamber, where it is contacted with a suitable substrate. Excess composition may then be removed from the reaction chamber by purging and/or evacuating the reaction chamber. An oxygen source is introduced into the reaction chamber where it reacts with the absorbed Si-containing film forming composition in a self-limiting manner. Any excess oxygen source is removed from the reaction chamber by purging and/or evacuating the reaction chamber. If the desired film is a silicon oxide film, this two-step process may provide the desired film thickness or may be repeated until a film having the necessary thickness has been obtained.

Alternatively, if the desired film is a silicon metal/metalloid oxide film (i.e., $SiMO_x$, wherein x may be 0-4 and M is B, Zr, Hf, Ti, Nb, V, Ta, Al, Si, Ga, Ge, or combinations thereof), the two-step process above may be followed by introduction of a vapor of a metal- or metalloid-containing precursor into the reaction chamber. The metal- or metalloid-containing precursor will be selected based on the nature of the silicon metal/metalloid oxide film being deposited. After introduction into the reaction chamber, the metal- or metalloid-containing precursor is contacted with the substrate. Any excess metal- or metalloid-containing precursor is removed from the reaction chamber by purging and/or evacuating the reaction chamber. Once again, an oxygen source may be introduced into the reaction chamber to react with the metal- or metalloid-containing precursor. Excess oxygen source is removed from the reaction chamber by purging and/or evacuating the reaction chamber. If a desired film thickness has been achieved, the process may be terminated. However, if a thicker film is desired, the entire four-step process may be repeated. By alternating the provision of the Si-containing film forming composition, metal- or metalloid-containing precursor, and oxygen source, a film of desired composition and thickness can be deposited.

Additionally, by varying the number of pulses, films having a desired stoichiometric M:Si ratio may be obtained. For example, a $SiMO_2$ film may be obtained by having one pulse of the Si-containing film forming composition and one pulse of the metal- or metalloid-containing precursor, with each pulse being followed by a pulse of the oxygen source. However, one of ordinary skill in the art will recognize that the number of pulses required to obtain the desired film may not be identical to the stoichiometric ratio of the resulting film.

The silicon-containing films resulting from the processes discussed above may include $SiO_2$; SiC; SiN; SiON; SiOC; SiONC; SiBN; SiBCN; SiCN; SiMO, SiMN in which M is selected from Zr, Hf, Ti, Nb, V, Ta, Al, Ge, depending of course on the oxidation state of M. One of ordinary skill in the art will recognize that by judicial selection of the appropriate Si-containing film forming composition and co-reactants, the desired film composition may be obtained.

Upon obtaining a desired film thickness, the film may be subject to further processing, such as thermal annealing, furnace-annealing, rapid thermal annealing, UV or e-beam curing, and/or plasma gas exposure. Those skilled in the art recognize the systems and methods utilized to perform these additional processing steps. For example, the silicon-containing film may be exposed to a temperature ranging from approximately 200° C. and approximately 1000° C. for a time ranging from approximately 0.1 second to approximately 7200 seconds under an inert atmosphere, a H-containing atmosphere, a N-containing atmosphere, or combinations thereof. Most preferably, the temperature is 600° C. for less than 3600 seconds. Even more preferably, the temperature is less than 400° C. The annealing step may be performed in the same reaction chamber in which the deposition process is performed. Alternatively, the substrate may be removed from the reaction chamber, with the annealing/flash annealing process being performed in a separate apparatus. Any of the above post-treatment methods, but especially UV-curing, has been found effective to enhance the connectivity and cross linking of the film, and to reduce the H content of the film when the film is a SiN containing film. Typically, a combination of thermal annealing to <400° C. (preferably about 100° C.-300° C.) and UV curing is used to obtain the film with the highest density.

The disclosed Si-containing film forming compositions may also be used in coating deposition processes to form silicon, silicon nitride, silicon oxide, silicon carbide, or silicon oxynitride films used in the electronics and optics industry. The silicon oxide films are obtained from thermal treatment of the deposited film under an oxidative atmosphere, containing at least one of $O_2$, $O_3$, $H_2O$, $H_2O_2$, NO, $N_2O$, and combinations thereof. The disclosed Si-containing film forming compositions may also be used to form protective coatings or pre-ceramic materials (i.e., nitrides and oxynitrides) for use in the aerospace, automotive, military, or steel industry or any other industry requiring strong materials capable of withstanding high temperatures For coating processes, the Si-containing film forming composition preferably comprises an isolated $Si_nH_{(2n+2)}$ compound or a $Si_nH_{(2n+2)}$ mixture, wherein n=10-100, preferably from 10-30 or 30-50. The $Si_nH_{(2n+2)}$ mixture may have a Mn ranging from approximately 400 Da to approximately 1000 Da, a Mw ranging from approximately 1000 Da to approximately 2000 Da, and a Mw/Mn ranging from approximately 1 to approximately 10.

The Si-containing film forming compositions used in coating processes may further comprise a solvent or solvent system having different boiling points in order to adjust the coating composition's properties, such as viscosity or layer thickness. Exemplary solvents include hydrocarbons such as benzene, toluene, xylene, mesitylene, or n-hexane; ketones, such as methylethylketone, cyclohexanone, or 2-heptanone; ethers, such as ethyl ether, di-butyl ether, or tetrahydrofuran; silanes such as m-tolyl silane, o-tolyl silane, p-tolyl silane, p-ethylphenyl silane, m-ethylphenyl silane, o-ethylphenyl silane, m-xylene, o-xylene, or combinations thereof; and amines, such as pyridine, xylene, or methyl pyridine; esters, such as 2-hydroxy ethyl propionate or hydroxyl ethyl acetate; and combinations thereof. An exemplary solvent system may contain one solvent that boils at lower temperatures, with a boiling point (BP) between 30° C. and 100° C., such as pentane, hexane, benzene, diethylether, methylethylether, cyclohexane, acetone etc. The solvent system may also comprise a second solvent may have a higher boiling point, with a BP between 70° C. and 200° C. such as toluene, THF, xylene, methyl isobutyl ketone, cyclohexanones, cyclopentanone, glycols, etc. To be suitable for coating methods, the Si-containing film forming composition should have a molecular weight ranging from approximately 500 to approximately 1,000,000, preferably from approximately 1,000 to approximately 100,000, and more preferably from approximately 3,000 to approximately 50,000. The solvent may comprise between approximately 60% w/w to approximately 99.5% w/w of the Si-containing film forming composition, preferably from approximately 80% w/w to approximately 99% w/w, and more preferably from approximately 85% w/w to approximately 95% w/w.

The Si-containing film forming composition may further comprise a perhydropolysilazane. One particularly preferred perhydropolysilazane is disclosed in US Pat App Pub No 2018/072571. The Si-containing film forming composition may comprise between approximately 0.5% w/w to approximately 99.5% w/w of the perhydropolysilazane, preferably between approximately 10% w/w to approximately 90% w/w of the perhydropolysilazane.

Other additives suitable for the Si-containing film forming composition include polymerization initiators, surfactants, pigments, UV absorbers, pH adjusters, surface modifiers, plasticizers, dispersing agents, catalysts, and combinations thereof. The catalyst may be the same or different from the catalyst used to synthesize the Si-containing film forming composition. Exemplary catalysts may be selected to facilitate further densification of the Si-containing film forming composition in subsequent processing steps by catalyzing desilylative coupling (DSC), cross-linking, or $H_2$ elimination. Such catalysts should be selected for their low activity at room temperature to keep the composition stable upon storage, and only induce reactions when heated to a temperature higher than room temperature, and ideally between 50° C. and 200° C. For instance, $P(Ph)_3$, $P(Tolyl)_3$ or metal carbonyl may be suitable catalysts for high temperature activation. The composition may also contain photoactive materials that will induce further cross-linking upon exposure to photons, such as photo-acid generators and photoinitiators such as radical initiators, cationic initiators, anionic photoinitiators, like mono-aryl ketones, trimethylbenzoyldiphenyl phosphinates, and/or phospine oxides.

The catalyst may also promote the conversion of the Si-containing film forming composition to silica.

The Si-containing films may be deposited using any coating methods known in the art. Examples of suitable coating methods include spin coating, dip coating, spray coating, fiber spinning, extrusion, molding, casting, impregnation, roll coating, transfer coating, slit coating, etc. For usage in non-semiconductor applications, the disclosed Si-containing film forming compositions may also contain a ceramic filler, such as BN, SiN, SiCN, SiC, $Al_2O_3$, $ZrO_2$, $Y_2O_3$, and/or $Li_2O$ powders. The coating method is preferably spin coating in order to provide suitable film thickness control and gapfill performance.

The disclosed Si-containing film forming compositions may be applied directly to the center of the substrate and then spread to the entire substrate by spinning or may be applied to the entire substrate by spraying. When applied directly to the center of the substrate, the substrate may be spun to utilize centrifugal forces to evenly distribute the composition over the substrate. One of ordinary skill in the art will recognize that the viscosity of the Si-containing film forming compositions will contribute as to whether rotation of the substrate is necessary. Alternatively, the substrate may be dipped in the disclosed Si-containing film forming compositions. The resulting films may be dried at room temperature for a period of time to vaporize the solvent or volatile components of the film or dried by force-drying or baking or by the use of one or a combination of any following suitable process including thermal curing and irradiations, such as, ion irritation, electron irradiation, UV and/or visible light irradiation, etc.

The spin-on Si-containing film forming compositions may also be used for the formation of transparent silicon oxynitride films suitable for optics applications.

When used for spin coating, dip coating or spray coating, the disclosed Si-containing film forming compositions may be used for the formation of silicon oxide or silicon nitride barrier layers that are useful as moisture or oxygen barriers, or as passivation layers in displays, light emitting devices and photovoltaic devices.

In semiconductor applications the Si-containing film forming compositions may be used for forming sacrificial layers such as etching hard masks, ion implantation masks, anti-reflective coatings, tone inversion layers. Alternatively, the Si-containing film forming compositions may be used for forming non-sacrificial layers ("leave behind" films), such as gapfill oxide layer, pre-metal dielectric layers, transistor stressing layers, etch stop layers, inter-layer dielectric layers, For Gap-fill applications, the trench or hole may have an aspect ratio ranging from approximately 0.5:1 to approximately 100:1. The Si-containing film forming compositions is typically spun on the substrate, pre-baked at 50° C.-300° C. to evaporate the solvent(s), and eventually converted to silicon oxide by annealing the substrate in an oxidizing atmosphere, typically containing $O_2$, $O_3$, $H_2O$, $H_2O_2$, $N_2O$, NO, at a temperature ranging from 300 to 1000° C. The oxide quality may be improved by a multi-step annealing process in various atmospheres (oxidative or inert).

Figure 5:
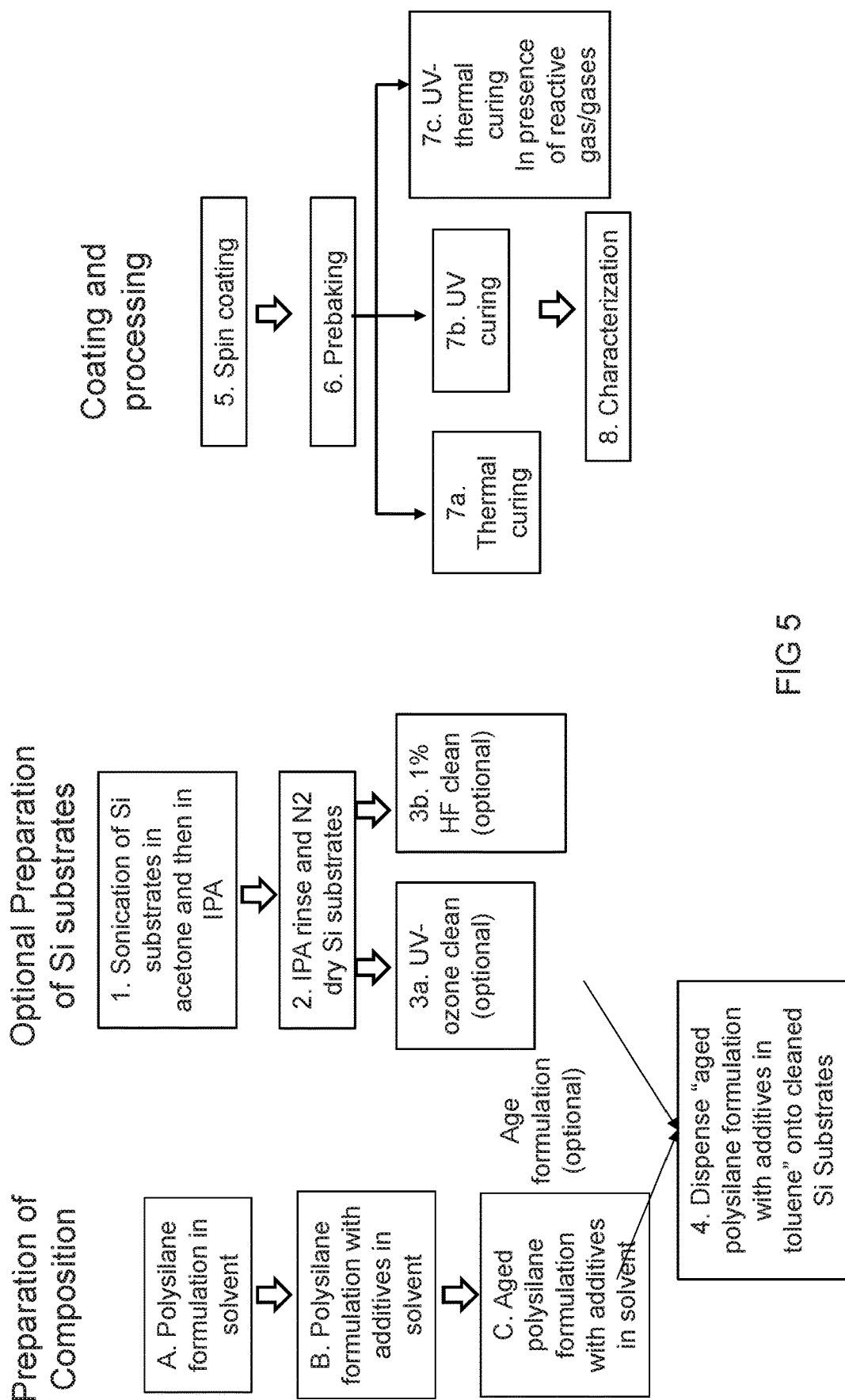
FIG. 5 is a flow chart diagraming exemplary processes for the preparation of the Si-containing film forming compositions, preparation of the silicon substrate, and the steps of the spin-coating process.

FIG. 5 is a flow chart diagraming exemplary processes for the preparation of the Si-containing film forming compositions, preparation of the silicon substrate, and the steps of a spin-coating process. One of ordinary skill in the art will recognize that fewer or additional steps than those provided in FIG. 5 may be performed without departing from the teachings herein. For example, the characterization step utilized in a R&D setting may not be required in commercial operations. One of ordinary skill in the art will further recognize that the process is preferably performed under an inert atmosphere to prevent undesired oxidation of the film and/or in a clean room to help prevent particle contamination of the film.

In Step A, the desired $Si_nH_{(2n+2)}$ product, wherein n=10-30 or n=30-50, is mixed with the solvent to form a 1-50 wt % mixture. Mixing mechanisms known in the art may be used to mix these two components (e.g., mechanical stirring, mechanical shaking, etc.). Depending on the ingredients, the mixture may be heated to a temperature ranging from 27° C. to approximately 100° C. The heating temperature should always remain lower than the pre-baking temperature. Depending on the specific ingredients, mixing may occur for 1 minute to 1 hour.

In Step B, the optional catalyst, optional perhydropolysilane, such as that disclosed in US Pat App No 2018/072571, or both may be added to the mixture and mechanically stirred in the same manner. Depending on the ingredients, the mixture may be heated to a temperature ranging from 27° C. to approximately 100° C. Depending on the specific ingredients, mixing may occur for 1 minute to 1 hour.

In Optional Step C, the mixture may be aged to allow any reaction between the additives to reach equilibrium. After mixing, the mixture may age for 1 hour to 2 weeks prior to use. Depending on the ingredients, the mixture may be aged at a temperature ranging from 27° C. to approximately 100° C. For catalyst-containing compositions, the catalyst and polysilane may partially react for a short period of time. Therefore, aging is recommended prior to use to stabilize the composition. Initial aging test results indicate that the composition reaches an equilibrium at which further shrinking of the resulting oxide film does not occur. One or ordinary skill in the art would be able to perform the necessary aging tests to determine the proper aging duration.

After Step B or Optional Step C, the mixture may be filtered to remove any particles or other solid content. One of ordinary skill in the art would recognize that the filter must be compatible with the components of the Si-containing film forming composition. PolyTetraFluoroEthylene (PTFE) is typically a suitable filtration material. The filter size ranges from approximately 0.02 micron to approximately 1 micron.

One of ordinary skill in the art will also recognize that other addition sequences are possible, such as the pre-blending of the catalyst in the solvent or one of the solvents to facilitate the mixing and enable a more homogeneous mixture with the desired $Si_nH_{(2n+2)}$ product.

An optional process to prepare a substrate for the spin-coating process is also provided in FIG. 5.

The planar or patterned substrate on which the Si-containing film is to be deposited may be prepared for the deposition process in Steps 1 and 2 and alternative Steps 3a and 3b. High purity gases and solvents are used in the preparation process. Gases are typically of semiconductor grade and free of particle contamination. For semiconductor usage, solvents should be particle free, typically less than 100 particles/mL (0.5 μm particle, more preferably less than 10 particles/mL) and free of non-volatile residues that would lead to surface contamination. Semiconductor grade solvents having less than 50 ppb metal contamination (for each element, and preferably less than 5 ppb) are advised.

In Optional Step 1, the substrate may be sonicated in a cleaning solvent, such as acetone, at room temperature (between approximately 20° C. and approximately 25° C.) for approximately 60 seconds to approximately 120 seconds, and preferably for approximately 90 seconds. The planar or patterned substrate may then be sonicated at room temperature in another cleaning solvent, such as isopropyl alcohol (IPA), for approximately 60 seconds to approximately 120 seconds, and preferably for approximately 90 seconds. One of ordinary skill in the art will recognize that these steps may be performed in the same or different sonicators. Different sonicators require more equipment, but provide an easier process. The sonicator must be thoroughly cleaned between Step 1 and 2 if used for both to prevent any contamination of the substrate. Exemplary sonicators suitable for the disclosed methods include Leela Electronics Leela Sonic Models 50, 60, 100, 150, 200, 250, or 500 or Branson's B Series.

In Optional Step 2, the substrate may be removed from the IPA sonicator and rinsed with fresh cleaning solvent. The rinsed substrate is dried using an inert gas, such as $N_2$ or Ar.

In Optional Step 3a, the substrates of Step 2 may be treated by UV-ozone for 1 hour at 25° C. and atmospheric pressure to generated OH-terminated hydrophilic surfaces when a hydrophilic surface is desired. Step 3a also further removes organic contaminations.

In Optional Step 3b, the substrates of Step 2 are dipped into a 1% HF water solution at 25° C. for 1-2 minute to etch away the top native oxide layer, and generate H-terminated hydrophobic surfaces when a hydrophobic surface is desired.

One of ordinary skill in the art will recognize that Optional Steps 1, 2 and alternative Steps 3a and 3B provide exemplary wafer preparation processes. Multiple wafer preparation processes exist and may be utilized without departing from the teachings herein. See, e.g., Handbook of Silicon Wafer Cleaning Technology, $3^{rd}$ Edition, 2017 (William Andrew). One of ordinary skill in the art may determine the appropriate wafer preparation process based at least upon the substrate material and degree of cleanliness required.

The substrates may proceed to the spin coating process after any of steps 2, 3a, or 3b.

The flow chart of FIG. 5 also diagrams an exemplary spin-coating process.

The substrate as optionally prepared above is transferred to the spin coater. Exemplary suitable spin coaters include Screen's Coat/Develop Track DT-3000, S-cubed's Scene12, EVG's 150XT, Brewer Science's Cee® Precision spin coaters, Laurell's 650 series spin coaters, Specialty Coating System's G3 spin coaters, or Tokyo Electron's CLEAN TRACK ACT equipment family. In Step 4, the Si-containing film forming compositions of Step B or C are dispensed onto the substrate of Step 2, 3a, or 3b. The wafer substrate is spun in Step 5. One of ordinary skill in the art will recognize that Step 4 and Step 5 may be performed sequentially (static mode) or concurrently (dynamic mode). Step 4 is performed using a manual or auto-dispensing device (such as a pipette, syringe, or liquid flow meter). When Steps 4 and 5 are performed concurrently, the initial spin rate is slow (i.e., between approximately 5 rpm to approximately 999 rpm, preferably between approximately 5 rpm to approximately 300 rpm). After all of the Si-containing film forming composition is dispensed (i.e., when Step 4 is complete in either static or dynamic mode), the spin rate ranges between approximately 1000 rpm to approximately 4000 rpm. The wafer is spun until a uniform coating is achieved across the substrate, which typically takes between approximately 10 seconds and approximately 3 minutes. Steps 4 and 5 produce a Si-containing film on the wafer. One of ordinary skill in the art will recognize that the required duration of the spin coating process, the acceleration rate, the solvent evaporation rate, etc., are adjustable parameters that require optimization for each new formulation in order to obtain the target film thickness and uniformity (see, e.g., University of Louisville, Micro/Nano Technology Center—Spin Coating Theory, October 2013).

After the Si-containing film is formed, the wafer is pre-baked or soft baked in Step 6 to remove any remaining volatile organic components of the PHPS composition and/ or by-products from the spin-coating process. Depending on the activation temperature of the catalyst, catalyzation may also commence in Step 6. Step 6 may take place in a thermal chamber or on a hot plate at a temperature ranging from approximately 30° C. to approximately 300° C., preferably 80° C. to 200° C. for a time period ranging from approximately 1 minute to approximately 120 minutes. Exemplary hot plates include EVG's 105 Bake Module, Brewer Science's Cee® Model 10 or 11, or Polos' precision bake plates.

In step 7, the substrate is cured to produce the desired material. 3 non-limiting options are shown in FIG. 5. Any of the 3 options may be performed using an inert or reactive gas. Exemplary inert gases include $N_2$, Ar, He, Kr, Xe, etc. The reactive gas may be used to introduce oxygen, nitrogen, or carbon into the film.

Exemplary reactive gases that introduce oxygen into the film include oxygen-containing gases, such as $O_2$, $O_3$, air, $H_2O$, $H_2O_2$, $N_2O$, NO, etc. Under an $O_2$/Ar, the curing temperature may range for approximately 400° C. to approximately 800° C. $O_2$ may be used as a curing gas. Alternatively, curing may occur under a $H_2O_2$ at temperatures ranging from approximately 300° C. to approximately 500° C. $H_2O_2$ is a strong oxidizer and may permit consistent Si oxide film consistency further into the trench.

Exemplary reactive gases that introduce carbon into the film include carbon-containing gases, and specifically unsaturated carbon-containing gases, such as alkenes and alkynes (ethylene, acetylene, propylene, etc.).

Exemplary reactive gases that introduce nitrogen into the film must have at least one N—H bond to enable the DHC reaction to proceed. For a completely C-free film, this means that the curing gas may comprise $NH_3$ or $N_2H_4$. Alternatively, C-containing N-sources may be used, but may yield some C in the film. Exemplary C-containing N sources include substituted hydrazines (i.e., $N_2R_4$, wherein each R is independently H or a C1-C4 hydrocarbon provided that at least one R is H) (e.g., $MeHNNH_2$, $Me_2NNH_2$, MeHNNHMe, phenyl hydrazine, t-butyl hydrazine, 2-cyclohexyl-1,1-dimethyhydrazine, 1-tert-butyl-1,2,2-trimethylhydrazine, 1,2-diethylhydrazine, 1-(1-phenylethyl)hydrazine, 1-(2-methylphenyl)hydrazine, 1,2-bis(4-methylphenyl)hydrazine, 1,2-bis(trityl)hydrazine, 1-(1-methyl-2-phenylethyl)hydrazine, 1-Isopropylhydrazine, 1,2-Dimethylhydrazine, N,N-Dimethylhydrazine, 1-Boc-1-methylhydrazine, Tetramethylhydrazine, Ethylhydrazine, 2-Benzylidene-1,1-dimethylhydrazine, 1-Benzyl-2-methylhydrazine, 2-Hydrazinopyrazine), primary or secondary amines (i.e., $H_xNR_{3-x}$, wherein each R is indendently a C1-C4 hydrocarbon and x is at 1 or 2) (e.g., $NMeH_2$, $NEtH_2$, $NMe_2H$, $NEt_2H$, $(SiMe_3)_2NH$, n-Butylamine, Sec-Butylamine, Tert-Butylamine, Dibutylamine, Diisopropylamine, N,N-Diisopropylethylamine, N,N-dimethylethylamine, Dipropylamine, Ethylmethylamine, Hexylamine, Isobutylamine, Isopropylamine, Methylhexanamine, Pentylamine, Propylamine, cyclic amines like pyrrolidine or pyrimidine), ethylene diamines (i.e., $R_2N—C_2H_4—NR_2$ wherein each R is independently H, a $C_1$-$C_4$ hydrocarbon with the proviso that at least one R is H) (e.g., ethylene diamine, N,N'-dimethylethylene diamine, tetramethylethylene diamine), pyrazoline, pyridine, radicals thereof, or mixtures thereof. If the desired Si-containing film also contains oxygen, C-containing N source may include $H_2N-C_xH_{2x}-OH$, with x=1-4 hydrocarbon, such as ethanolamine. Preferably the reactant is $NH_3$, radicals thereof, or mixtures thereof.

In Step 7a, the substrate is subject to thermal curing at a temperature ranging from approximately 101° C. to approximately 1,000° C., preferably from approximately 200° C. to approximately 800° C., under an inert or reactive gas. A furnace or rapid thermal processor may be used to perform the thermal curing process. Exemplary furnaces include the ThermoFisher Lindberg/Blue M™ tube furnace, the Thermo Scientific Thermolyne™ benchtop tube furnace or muffle furnace, the Inseto tabletop quartz tube furnace, the NeyTech Vulcan benchtop furnace, the Tokyo Electron TELINDY™ thermal processing equipment, or the ASM International ADVANCE® vertical furnace. Exemplary rapid thermal processors include Solaris 100, ULVAC RTP-6, or Annealsys As-one 100.

Alternatively, in Step 7b, the substrate is subject to UV-curing at a wavelength ranging from approximately 190 nm to approximately 400 nm using a monochromatic or polychromatic source. Exemplary VUV- or UV-curing systems suitable to perform Step 8b include, but are not limited to, the Nordson Coolwaves® 2 UV curing system, the Heraeus Noblelight Light Hammer® 10 product platform, or the Radium Xeradex® lamp.

In another alternative of Step 7c, both the thermal and UV process may be performed at the same temperature and wavelength criteria specified for Steps 7a and 7b. The thermal and UV curing may be performed simultaneously or sequentially. One of ordinary skill in the art will recognize that the choice of curing methods and conditions will be determined by the target silicon-containing film desired.

In another alternative, the thermal curing process may proceed in a stepwise fashion. More particularly, the thermal curing may start at a temperature ranging from approximately 50° C. to approximately 500° C. under an inert or reactive gas for a time period ranging from approximately 10 to approximately 30 minutes. The temperature may be increased by approximately 50° C. to approximately 150° C. and maintained for an additional 10 to 30 minutes. Additional incremental temperature increases may be used, if necessary. Alternatively, the temperature may be increased using a specified ramp and then maintained at specific temperatures for a short period of time. For example, the wafer may be placed in a room temperature chamber being heated at a ramping rate of approximately 1° C./minute to approximately 100° C./minute, preferably from approximately 5° C./minute to approximately 40° C./minute, and more preferably from approximately 10° C./minute to approximately 20° C./minute. Once the temperature reaches the desired heating temperature, for example approximately 100° C. to approximately 400° C., the ramping may be stopped for a specified period of time, for example ranging from approximately 5 minutes to approximately 120 minutes. The same or a different ramping temperature rate may then be used to increase the chamber temperature to the next desired heating temperature, for example approximately 300° C. to approximately 600° C. and be maintained for another specified period of time, for example ranging from approximately 5 minutes to approximately 120 minutes. This may be repeated for again if a third heating temperature is desired, for example approximately 500° C. to approximately 1,000° C. and maintained for another specified period of time, for example ranging from approximately 5 minutes to approximately 300 minutes. In yet another alternative, the curing may use a slow, steady heating ramp without any specified time spent at any specific temperature (e.g., approximately 0.5/minute to approximately 3° C./minute). Once curing is complete, the furnace is allowed to cool to room temperature at a cooling rate ranging from approximately 1° C./minute to approximately 100° C./minute. Applicants believe that any of these thermal curing steps may help to reduce formation of cracks and voids in the resulting film.

Additionally, shrinkage may be further reduced by controlling the $O_2:H_2O$ ratio when an oxygen-containing atmosphere is required. Preferably, the $O_2:H_2O$ ratio ranges from approximately 6:1 to approximately 2.5:1. Alternatively, shrinkage may be reduced using an $H_2O_2:H_2O$ atmosphere. The shrinkage may be calculated as: 100%×[1−(hardbake film thickness)/(prebaked film thickness)]. The disclosed Si-containing film forming compositions may provide oxide shrinkage ranging from approximately −5% to approximately 15%, preferably from approximately 0% to approximately 10%, and more preferably from approximately 0% to approximately 5%. After curing, the resulting $SiO_2$ film has a O:Si ratio ranging from approximately 1.8:1 to approximately 2.1:1. The C content of the resulting $SiO_2$ film ranges from approximately 0 atomic % to approximately 7 atomic %, preferably from approximately 0 atomic % to approximately 5 atomic %. The Si, O, and C concentrations may be determined by X-ray photoelectron spectroscopy (XPS). The wet etch rate ratio of the cured $SiO_2$ film using a 1% HF-water solution ranges from approximately 1:1 to approximately 5:1 as compared to thermal oxide grown at 1100° C.

In Step 8, the cured film is characterized using standard analytic tools. Exemplary tools include, but are not limited to, ellipsometers, x-ray photoelectron spectroscopy, atomic force microscopy, x-ray fluorescence, fourier-transform infrared spectroscopy, scanning electron microscopy, secondary ion mass spectrometry (SIMS), Rutherford backscattering spectrometry (RBS), profilometer for stress analysis, or combination thereof.

The silicon-containing films resulting from the processes discussed above may include $SiO_2$; SiN; SiON; SiOC; SiONC; SiCN; SiMCO, in which M is selected from Zr, Hf, Ti, Nb, V, Ta, Al, Ge, B, Nb. One of ordinary skill in the art will recognize that by judicial selection of the appropriate Si-containing film forming composition and co-reactants, the desired film composition may be obtained.

The disclosed Si-containing film forming compositions provide less shrinkage of Si-containing films than prior art NH-containing PHPS compositions for applications in shallow trench isolation dielectrics, pre-metal dielectrics, and inter-layer dielectrics in semiconductor electronic devices. Applicants believe that the oxide film produced from the disclosed Si-containing film forming compositions will have approximately 95-100% stoichiometric uniformity between the bottom and top of any features and preferably 98-100% as determined by X-ray Photoelectron Spectroscopy (XPS) or Energy Dispersive X-ray (EDX0) spectroscopy. Applicants further believe that the resulting oxide films will have a thin film stress measurement ranging from approximately −160 MPa to approximately +160 MPa as determined by profilometer.

The recipe for the curing of the film and conversion to $SiO_2$ is also widely investigated to decrease the shrinkage, as it is believed that the shrinkage is related to the loss (volatilization) of short oligomers before they are oxidized during the curing step. As such, there is a competition between oxidation during curing and evaporation of short chain silicon containing oligomers, and the curing recipe (composition of the vapor phase, temperature ramp speed, etc. have a significant impact on the final film shrinkage.

Overall, both parameters combine to yield the final shrinkage.

For a further understanding of the nature and objects of the present invention, reference should be made to the following detailed description, taken in conjunction with the accompanying drawing wherein:

EXAMPLES

The following non-limiting examples are provided to further illustrate embodiments of the invention. However, the examples are not intended to be all inclusive and are not intended to limit the scope of the inventions described herein.

The reaction products can be analyzed by any suitable means, such as by gas chromatography (GC) using part of the product stream or an aliquot of the product. In the following examples, GC analysis was performed on Agilent 7890A and Agilent 6890 Gas Chromatographs equipped with Thermal Conductivity Detector (TCD). The injection port was under inert ($N_2$ or Ar) atmosphere.

Exemplary method: Column: Rtx-1 (Cross bond Dimethyl Polysiloxane) 105 m×0.53 mm×5 µm. Detector T=250° C.; Reference flow: 20 mL/min; Makeup flow: 5 mL/min; Carrier gas: 5 mL/min (Helium); Oven: 35° C., 8 min, ramp 20° C./min, 200° C., 13 min; Injector: 200° C.; Splitless mode; Sample Size: 1.0 µL.

Example 1. Preparation of Polysilanes from $Si_3H_8$ and $B(C_6F_5)_3$

Solid $B(C_6F_5)_3$ (0.25 g, 0.5 mmol) was placed in a 250 mL three necked flask in a glove box under nitrogen atmosphere. The flask was equipped with the reflux condenser and connected to the vacuum/nitrogen line. Liquid $Si_3H_8$ (71.6 g, 775.6 mmol) was introduced to the flask under nitrogen. The mixture was heated to 49-54° C. with stirring for 6 hours, at 1 atm of $N_2$. The reflux condenser was maintained at −30° C. during the reaction. Silane formed during the reaction was condensed in the liquid nitrogen trap installed after the reflux condenser. Non-condensable gas (hydrogen) was vented. After 6 hours, the reaction mixture was cooled to room temperature. The reflux condenser was disconnected. All the volatiles were transferred into the liquid nitrogen trap under dynamic vacuum leaving 22.25 g of a nonvolatile liquid (polysilane) in the flask. The nonvolatile liquid was a mixture of silanes with 6 and more silicon atoms [GC]. GC analysis of the volatile fraction collected in the liquid nitrogen trap revealed a mixture of $Si_2$-$Si_8$ silanes containing 1.4% $Si_2H_6$; 89.6% $Si_3H_8$; 2.5% iso-$Si_4H_{10}$ and 4.1% n-$Si_4H_{10}$, 1.3% $Si_5H_{12}$ total and 0.7% of silanes with 6 or more silicon atoms in total.

For storage, the nonvolatile liquid (polysilane) was dissolved in diisopropylamine to have a 35% or 10% solution by weight.
Structures:

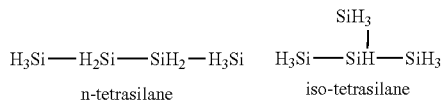

n-tetrasilane     iso-tetrasilane

Two more reactions are provided in the table below to illustrate the conditions and reproducibility of synthesis (Table 1).

TABLE 1

Experimental conditions for example 1

| $Si_3H_8$ (gram) | $B(C_6F_5)_3$ (gram) | Obtained non-volatile polysilane liquid (g) | T (° C.) |
|---|---|---|---|
| 47.5 | 0.12 g | 13.39 | 50.8 ± 1.3, |
| 60.8 | 0.10 g | 12.15 | 46.4 ± 1.1, |
| 71.6 | 0.25 | 22.25 | 52.3 ± 1.1 |

Analysis: $^1$H NMR of neat polysilane, Magritek Spinsolve 60 NMR specrometer, $^1$H NMR (δ(TMS), neat, 22° C.): overlapped multiplets: 3.4-3.8 ppm, maximum of resonance at 3.5-3.6 ppm, overlapped resonances due to Si—H, Si—H$_2$ and SiH$_3$, established by 2D $^{29}$Si-$^1$H multiplicity-edited HSQC.

$^1$H NMR of polysilane solution in diisopropylamine, Magritek Spinsolve 60 NMR spectrometer, (δ(TMS), diisopropylamine, 22° C.): overlapped multiplets: 3.2-4.0 ppm, maximum of resonance at 3.57 ppm.

Gel Permeation Chromatography (GPC) was conducted based on a polystyrene standard using a refractive index detector. The GPC results are provided in FIG. 6. The results are summarized in Table 2:

TABLE 2

GPC data for prepared polysilanes.

| | N | | |
|---|---|---|---|
| | 1 | 2 | 3 |
| Mn (DA) | 534 ± 27 | 417 | 612 ± 54 |
| Mw (DA) | 1,345 ± 94 | 670 | 1,749 ± 291 |
| Mw/Mn | 2.518 ± 0.05 | 1.6 | 2.85 ± 0.22 |
| Approximated number of [SiH$_2$] | 18 | 14 | 20 |

GPC data illustrate that the non-volatile fractions contain silanes with 14-20 silicon atoms, not detectable by GC. The molecular weight of polysilane depends on the experimental conditions, namely temperature.

A reproducible formation of a liquid polymer from trisilane with Mn 400-600 DA at the given temperatures, amount of catalyst, substrate and duration of reaction 4-8 hours (see Table 4) is unexpected. For comparison, at T=100° C. and 120° C., polymerization of PhSiH$_3$ by $B(C_6F_5)_3$ afforded a polymer with a molecular weight more than 1000 DA, and 200 DA in only one example with the lowest amount of $B(C_6F_5)_3$ (0.4%) [*Chemistry—A European Journal*, 2013, 19, 12526-12536].

Comparative Example 1. Summary of Results for Prior Art Catalysts with Liquid $Si_3H_8$ Catalysis of liquid $Si_3H_8$ using the prior art homogeneous catalysts $Cp_2ZrCl_2$/BuLi, $Cp_2ZrCl_2$/LiNMe$_2$, $RuCl_4$(p-Cymene)$_2$, and Ni(COD)$_2$ (COD=cyclooctadienyl) was performed [catalysts from Joyce Y. Corey, "Dehydrocoupling of Hydrosilanes to Polysilanes and Silicon Oligomers: A 30 Year Overview", Advances in Organometallic Chemistry, Volume 51, 2004 Elsevier Inc.]. Catalysis of liquid $Si_3H_8$ using the prior art heterogeneous catalysts Ru (5%)/C and Rh (5%)/C was also performed [catalysts from "Method for Producing a Semiconductor Material", Keizo Ikai; Masaki Minami; Mitsuo Matsuno, Nippon Oil Co., Ltd., U.S. Pat. No. 5,700,400 A, Aug. 14, 1995]. FeCl$_3$ on silica and in combination with MMAO (MMAO=modified methylaluminoxane, formula [(CH$_3$)$_{0.95}$(n-C$_8$H$_{17}$)$_{0.05}$AlO]$_n$) were also tested.

TABLE 3

Comparative test of catalysts toward the liquid trisilane.

| Catalyst (g) per 3-4 g $Si_3H_8$ | Additive | time | Result | $Si_4H_{10}$, $Si_5H_{12}$ % |
|---|---|---|---|---|
| $Cp_2ZrCl_2$ (0.32 g) | BuLi 2.5M in Hexane | 1 min | Polymer | n.d. |
| $Cp_2TiCl_2$ (0.27 g) | BuLi 2.5M in Hexane | 5 min | Polymer | n.d. |
| $Cp_2ZrCl_2$ (<0.01 g) | $LiNMe_2$ | 1.5 h | Polymer | n.d. |
| $Cp_2TiCl_2$ (0.27 g) | $LiNMe_2$ | 0.5 h | Polymer | n.d. |
| $Cp_2ZrCl_2$ (0.02 g) | Tiba ($Al^iBu_3$) (0.15 g) | 5 h | No reaction | similar |
| $FeCl_3$ (5%) on Silica (0.11 g) | No | 3 h | No reaction | similar |
| $FeCl_3$ (5%) on Silica (0.11 g) | MMAO (Fe:Al = 1:100) | 3 h | No reaction | similar |
| $RuCl_4$(p-Cymene)$_2$ | No | 24 h | No reaction | similar |
| $RuCl_4$(p-Cymene)$_2$ | MMAO12(35%) on silica | 24 h | No reaction | similar |
| $RuCl_4$(p-Cymene)$_2$ | $Al^iBu_3$/ MMAO12 (35%) on silica | 24 h | No reaction | similar |
| Ni(COD)$_2$ | No | 24 h | No reaction | similar |
| Ru (5%)/C | No | 24 h | No reaction | similar |
| Rh (5%)/C | No | 24 h | No reaction | similar |

COD = cyclooctadiene
n.d. = not detected.
similar = relative amount of higher silanes after test is similar to that in trisilane before test within (±0.2%)

The $CpTiCl_2$ and $CpZrCl_2$ homogeneous catalysts polymerized trisilane to a non-volatile solid in a non-controllable fashion. As a result, these catalysts are not useful for controllable synthesis of isomerically enriched tetrasilane or liquid higher silanes.

The $RuCl_4$(p-Cymene)$_2$, Ni(COD)$_2$, and $FeCl_3$ homogeneous catalysts and Ru (5%)/C and Rh (5%)/C heterogeneous catalysts are not active for the transformation of non-substituted liquid trisilane to a higher silanes.

Example 2. Oxide Film Formation Using PHPS with Polysilane and High-Temperature Hardbaking 7 wt % polysilane formulation in toluene was blended with a 7 wt % PHPS formulation in toluene at a volume ratio of 1:1. The Polysilane was prepared similar to that of Example 1 and had a Mn of 534 and Mw of 1345. The PHPS formulation was prepared as disclosed in Example 8 of US Pat App Pub No 2018/072571 and had a Mn of 2150 and a Mw of 6390. After blending, 0.1-0.2 mL of the mixed formulation was spin coated onto a 1" square Si wafer at 1500 rpm for 1 minute in a $N_2$ filled glove box. The film formed on the Si wafer was prebaked on a hot plate at 150° C. for 3 minutes in the glove box. The wafer was removed from the glove box, and the film thickness was measured using an ellipsometer. Three different hardbaking temperatures were used to compare the shrinkage of films from PHPS-only formulations and the PHPS-polysilane blended formulations. The film performance, listed in Table 4, shows that adding Polysilanes reduces film shrinkage by up to 3.2%. XPS data show that these films are C and N free, and they have a chemical composition of $SiO_{1.9-2.0}$, which is stoichiometric.

TABLE 4

| Formulation | Hardbake Temp. (C) | Film Thickness (nm) | Shrinkage (%) | RI[1] | WER[2] | O:Si (XPS) |
|---|---|---|---|---|---|---|
| PHPS | 600 | 422 | 15.6 | 1.45 | 2.9 | 1.8 |
|  | 700 | 400 | 18.8 | 1.48 | 1.6 | 1.9 |
|  | 800 | 403 | 19.6 | 1.47 | 1.1 | 1.9 |

TABLE 4-continued

| Formulation | Hardbake Temp. (C) | Film Thickness (nm) | Shrinkage (%) | RI[1] | WER[2] | O:Si (XPS) |
|---|---|---|---|---|---|---|
| PHPS + Polysilane | 600 | 220 | 14.9 | 1.45 | 2.4 | 1.9 |
|  | 700 | 213 | 15.5 | 1.45 | 1.9 | 2.0 |
|  | 800 | 220 | 16.4 | 1.46 | 1.3 | 2.9 |

[1] RI = Refractive Index
[2] WER = Wet Etch Rate calculated from the thickness measured prior and after etching in 1% HF solution

Example 3. Oxide Film Formation Using PHPS with Polysilane and Low-Temperature Hardbaking The same 7 wt % polysilane formulation in toluene of Example 2 was blended with the same 7 wt % NH-free PHPS formulation in toluene of Example 2 at a volume ratio of 1:1. After blending, 0.1-0.2 mL of the mixed formulation was spin coated onto a 1" square Si wafer at 1500 rpm for 1 minute in a $N_2$ filled glove box. The resulting films were processed in the same way as described in Example 11. The film performance, listed in Table 5, shows that adding Polysilanes can reduce film shrinkage by ~2%. XPS data show that these films are C and N free, and they have a chemical composition of $SiO_2$, which is nearly stoichiometric.

TABLE 5

| Formulation | Thickness-Hardbaked (nm) | Shrinkage (%) | RI[1] | WER[2] | O:Si (XPS) |
|---|---|---|---|---|---|
| PHPS | 455 | 9.6 | 1.46 | 2.5 | 1.9 |
| PHPS + Polysilane | 241 | 7.5 | 1.44 | 2.6 | 2.0 |

[1] RI = Refractive Index
[2] WER = Wet Etch Rate calculated as in Example 11

Example 4. PHPS With Catalyst and Polysilane and Low-Temperature Hardbaking

A 1/1 w/w PHPS/Polysilane formulation was prepared by mixing 10 wt % Polysilane formulation in diisopropylamine with the 7 wt % NH-free PHPS formulation in toluene of Example 2. The Polysilane has a Mw of 554 with a $M_n$ of 509. 2 wt % of $Co_2(CO)_8$ catalyst was added into this PHPS/Polysilane formulation. Then the PHPS/Polysilane/$Co_2(CO)_8$ formulation was filtered through a 200 nm PTFE syringe filter. 0.1-0.2 mL of this formulation was spin coated onto a 1" square Si wafer at 1500 rpm for 1 minute in a $N_2$ filled glove box. The deposited film on the Si wafer was prebaked on a hot plate at 150° C. for 3 minutes in the glove box. The prebaked film was removed from the glove box and the film thickness was measured by using an ellipsometer. The prebaked film was loaded into a tube furnace and was hardbaked at 400° C. for 3 hours under atmospheric pressure with 10% hydrogen peroxide, 33% steam, and 57% $N_2$. After hardbaking, the film thickness was measured again to obtain the hardbaked film thickness, and the shrinkage was calculated as: 100%×[1−(hardbake film thickness)/(prebaked film thickness)]. The results are listed in Table 6.

TABLE 6

| Formulation | Thickness-Hardbaked (nm) | Shrinkage (%) | RI[1] | WER[2] |
|---|---|---|---|---|
| PHPS + Polysilane + $Co_2(CO)_8$ | 331 | 7.0 | 1.47 | 2.7 |

Example 5. Polysilane and Low-Temperature Hardbaking

A solution of Polysilane formulation was prepared by mixing 4.5 wt % Polysilane formulation in 1.5 wt % diisopropylamine and 94 wt % p-tolysilane. Then the formulation was filtered through a 200 nm PTFE syringe filter. 0.1-0.2 mL of this formulation was spin coated onto a 1" square Si wafer at 1500 rpm for 1 minute in a $N_2$ filled glove box. The deposited film on the Si wafer was prebaked on a hot plate at 150° C. for 3 minutes in the glove box. The prebaked film was removed from the glove box and the film thickness was measured by using an ellipsometer. The prebaked film was loaded into a tube furnace and was hardbaked at 400° C. for 3 hours under atmospheric pressure with 10% hydrogen peroxide, 33% steam, and 57% $N_2$. After hardbaking, the film thickness was measured again to obtain the hardbaked film thickness, and the shrinkage was calculated as: 100%×[1−(hardbake film thickness)/(prebaked film thickness)]. The results are listed in Table 7.

TABLE 7

| Formulation | Thickness-Hardbaked (nm) | Shrinkage (%) | RI[1] | WER[2] |
|---|---|---|---|---|
| Polysilane | 82 | 3.6 | 1.42 | 2.9 |

While embodiments of this invention have been shown and described, modifications thereof can be made by one skilled in the art without departing from the spirit or teaching of this invention. The embodiments described herein are exemplary only and not limiting. Many variations and modifications of the composition and method are possible and within the scope of the invention. Accordingly the scope of protection is not limited to the embodiments described herein, but is only limited by the claims which follow, the scope of which shall include all equivalents of the subject matter of the claims.

We claim:

1. A method of producing $Si_nH_{(2n+2)}$, wherein n=4-100, the method comprising:
    reacting a liquid $Si_aH_{(2a+2)}$ reactant, wherein a=1-4, with a $B(C_6F_5)_3$ catalyst to produce $Si_nH_{(2n+2)}$, wherein n>a.

2. The method of claim 1, wherein the $Si_aH_{(2a+2)}$ reactant is $Si_3H_8$.

3. The method of claim 1, wherein the $Si_aH_{(2a+2)}$ reactant is a mixture of $Si_3H_8$ and $Si_4H_{10}$.

4. The method of claim 1, wherein n=11-30.

5. The method of claim 1, further comprising fractionally distilling $Si_nH_{(2n+2)}$ to produce a Si-containing film forming composition comprising approximately 95% w/w to approximately 100% w/w n-$Si_5H_{12}$.

6. The method of claim 1, further comprising fractionally distilling $Si_nH_{(2n+2)}$ to produce a Si-containing film forming composition comprising approximately 95% w/w to approximately 100% w/w n-$Si_6H_{14}$.

7. The method of claim 1, further comprising fractionally distilling $Si_nH_{(2n+2)}$ to produce a Si-containing film forming composition comprising approximately 95% w/w to approximately 100% w/w n-$Si_7H_{16}$.

8. The method of claim 1, further comprising fractionally distilling $Si_nH_{(2n+2)}$ to produce a Si-containing film forming composition comprising approximately 95% w/w to approximately 100% w/w n-$Si_8H_{18}$.

\* \* \* \* \*